United States Patent
Kamada et al.

(10) Patent No.: US 7,899,318 B2
(45) Date of Patent: Mar. 1, 2011

(54) PHOTOGRAPHIC APPARATUS AND PHOTOGRAPHIC METHOD

(75) Inventors: Yasunori Kamada, Kanagawa (JP); Takayasu Kon, Tokyo (JP); Yoichiro Sako, Tokyo (JP); Kazunori Hayashi, Tokyo (JP); Itaru Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 324 days.

(21) Appl. No.: 12/247,542

(22) Filed: Oct. 8, 2008

(65) Prior Publication Data

US 2009/0110386 A1    Apr. 30, 2009

(30) Foreign Application Priority Data

Oct. 31, 2007 (JP) .............................. 2007-283487

(51) Int. Cl.
*G03B 7/00* (2006.01)
(52) U.S. Cl. ...................................... 396/223
(58) Field of Classification Search .................. 396/223
See application file for complete search history.

(56) References Cited

U.S. PATENT DOCUMENTS

2005/0036035 A1* 2/2005 Takemoto .............. 348/207.99
2006/0056832 A1* 3/2006 Yamaguchi et al. ............ 396/56
2006/0215026 A1* 9/2006 Kamata et al. ............... 348/143
2008/0062291 A1* 3/2008 Sako et al. ................... 348/294

FOREIGN PATENT DOCUMENTS

| JP | 09-224176 | 8/1997 |
| JP | 2004-356970 | 12/2004 |
| JP | 2005-077924 A | 3/2005 |

* cited by examiner

*Primary Examiner*—Clayton E Laballe
*Assistant Examiner*—Warren K Fenwick
(74) *Attorney, Agent, or Firm*—Wolf, Greenfield & Sacks, P.C.

(57) ABSTRACT

A photographic apparatus infers a user's photographic intent and accordingly switches between a manual shoot mode and an automatic shoot mode. In the manual shoot mode, processing to save photographic image data is timed in accordance with the user operating a user-operable shutter element, while in the automatic shoot mode, such processing is conducted independently of shutter element operations. A photographic unit photographs a scene, acquires photographic image data of a subject, and then executes processing for saving the photographic image data. An intention judgment information detector detects intention judgment information used to judge the photographic intent of the user. A controller makes an intention judgment using the intention judgment information from the intention judgment information detector, and according to the intention judgment result, causes the photographic unit to selectively execute the operations for one of the modes.

12 Claims, 14 Drawing Sheets

PHOTOGRAPHIC APPARATUS AND PHOTOGRAPHIC METHOD

CROSS REFERENCES TO RELATED APPLICATIONS

The present invention contains subject matter related to Japanese Patent Application JP 2007-283487 filed in the Japanese Patent Office on Oct. 31, 2007, the entire contents of which are incorporated herein by reference.

BACKGROUND OF THE INVENTION

1. Field of the Invention

The present invention relates to a photographic apparatus and photographic method for photographing a subject scene. More particularly, the present invention relates to a photographic apparatus configured to be able to execute manual shooting and automatic shooting.

2. Description of the Related Art

JP-A-2004-356970 discloses technology wherein an image recording method is made to differ between images shot using an ordinary digital still camera or video camera by means of manual operation (such as a shutter operation), and images shot automatically by a wearable camera worn on the user's body.

SUMMARY OF THE INVENTION

However, consider a photographic apparatus configured to be able to selectively execute a manual shoot mode, wherein processing to save a photographed image is timed in accordance with to a user's shutter operations, as well as an automatic shoot mode, wherein processing to save a photographed image is conducted independently of the user's shutter operations. In this case, it is desirable to configure the photographic apparatus to be able to switch between the above modes in a manner suitable to the user, and operate suitably in each mode.

For example, photography in automatic shoot mode may involve automatically taking photographs at regular intervals while the photographic apparatus is being worn by the user, and thus it may be assumed that, in the automatic shoot mode, the photographic apparatus is to be used as a life log camera, photographing and saving scenes of the user's activity. However, if the user encounters a scene that he or she particularly wishes to photograph while the photographic apparatus is in the automatic shoot mode, it is preferable that the photographic apparatus be able to immediately operate in manual shoot mode. Moreover, if the user becomes confused with respect to the operations for switching the shoot mode, then the photographic opportunity may be lost.

Consequently, in the present invention it is desirable to provide a photographic apparatus wherein a manual shoot mode and an automatic shoot mode are easily and appropriately differentiated in usage, and furthermore wherein the photographic apparatus operates in a manner suitable for the respective modes.

A photographic apparatus in accordance with an embodiment of the present invention is provided with the following: photographic means for photographing a scene, acquiring photographic image data of a subject, and then executing processing for saving the photographic image data; intention judgment information detecting means for detecting intention judgment information used to judge the photographic intent of the user; and control means able to cause the photographic means to execute operations for both a manual shoot mode, wherein processing to save photographic image data is timed in accordance with operations of a user-operable shutter element by the user, as well as an automatic shoot mode, wherein processing to save photographic image data is conducted independently of shutter element operations, while in addition, the control means also makes an intention judgment using intention judgment information from the intention judgment information detecting means, and according to the intention judgment result, causes the photographic means to selectively execute the operations for either the manual shoot mode or the automatic shoot mode.

In addition, while causing the photographic means to execute the operations for the automatic shoot mode, the control means may make an intention judgment using intention judgment information from the intention judgment information detecting means, and depending on the intention judgment result, subsequently cause the photographic means to execute the operations for the manual shoot mode.

In addition, the photographic apparatus may be further provided with display means for producing a monitor display of a subject image while photographic operations are being conducted by the photographic means (i.e., a subject image is displayed while the user is attempting to suitably time a shutter operation). In this case, the control means conducts a control that causes the display means to produce the monitor display while in the manual shoot mode, and turn off the monitor display while in the automatic shoot mode.

In addition, while in the automatic shoot mode, the control means may put the user-operable shutter element in a locked state (i.e., an inoperable state or a disabled state).

In addition, the control means may also cause the photographic means to execute processing to save photographic image data using respectively different image sizes for the automatic shoot mode and the manual shoot mode.

In addition, the control means may also cause the photographic means to execute processing to save photographic image data such that compression processing is specified using respectively different compression ratios for the automatic shoot mode and the manual shoot mode.

In addition, the control means may also make an intention judgment using intention judgment information from the intention judgment information detecting means, wherein the control means determines whether or not the main body of the photographic apparatus has been held by the user for at least a predetermined amount of time.

In addition, the control means may also make an intention judgment using intention judgment information from the intention judgment information detecting means, wherein the control means determines whether or not the main body of the photographic apparatus has moved in a predetermined direction, and after such movement is detected, whether or not the body of the photographic apparatus has been in a stationary state for at least a predetermined amount of time.

In addition, the control means may also make an intention judgment using intention judgment information from the intention judgment information detecting means, wherein the control means determines whether or not the main body of the photographic apparatus has moved from a worn position, and after such movement is detected, whether or not the main body of the photographic apparatus has been in a stationary state for at least a predetermined amount of time.

In addition, the intention judgment information detecting means may include a user photographic unit for acquiring an image of the user, as well as an image analyzer for analyzing an image acquired by the user photographic unit. In this case, the control means makes an intention judgment on the basis of the analysis result of the image analyzer.

A photographic method in accordance with an embodiment of the present invention is a photographic method for a photographic apparatus that photographs a scene, acquires photographic image data of a subject, and then executes processing to save the photographic image data. The method includes the steps of: operating in an automatic shoot mode, wherein processing to save photographic image data is automatically conducted independently of operations of a user-operable shutter element; while operating in the automatic shoot mode, making an intention judgment for judging the photographic intent of the user; and, depending on the results of the judgment with respect to the photographic intent of the user that was conducted in the judging step, operating in a manual shoot mode, wherein processing to save photographic image data is timed in accordance with operations of a user-operable shutter element by the user.

In the foregoing embodiments in accordance with the present invention, photographic operation is accurately switched, in accordance with the user's intent, between an automatic shoot mode used to create a life log, for example, and a manual shoot mode used to photograph scenes by means of the user's shutter operations.

The intent of a user attempting to manually photograph a scene is determined using intention judgment information detected by intention judgment information detecting means. The intention judgment information is detected information regarding operations in accordance with the photographic intent of the user. The intention judgment information is supplied to the control means by the intention judgment information detecting means. The control means judges the intent of the user attempting to photograph a scene on the basis of user actions with respect to the photographic apparatus. For example, the control means may determine that the user has been holding the photographic apparatus in a manner enabling the user to press the user-operable shutter element, and furthermore that the photographic apparatus has been held in this state for a certain amount of time. Alternatively, the control means may determine that the photographic apparatus has moved to a position where manual shooting is ordinarily conducted, and furthermore that the photographic apparatus is now in a stationary state at that position. In so doing, the control means infers the intent of the user. The photographic apparatus is then switched between the automatic shoot mode and the manual shoot mode on the basis of the result of the intention judgment.

Furthermore, the operation of the photographic apparatus is appropriately switched according to differences in operation and purpose between automatic shooting and manual shooting. For example, the monitor display used to determine the photographic subject in manual shooting is typically unused in automatic shooting. The operation of the shutter key is likewise unused. Consequently, while in automatic shoot mode, the monitor display may be turned off, and the shutter key may be locked. Furthermore, it is also preferable to switch settings such as the image size and compression ratio of the photographed image data according to the significance of the photographic operations conducted in the respective modes. For example, with manual shooting, it can be assumed that photography at a higher image quality than that of automatic shooting is typically desired, whereas with automatic shooting, more consideration is given to memory capacity, as the amount of saved photographic image data can become very large. Due to the above considerations, settings such as the image size and compression ratio of the photographed image data are appropriately configured for the respective modes.

According to an embodiment of the present invention, processing is executed to switch between an automatic shoot mode and a manual shoot mode in accordance with the result of a judgment regarding the photographic intent of the user. As a result, the user is able to switch between automatic shooting and manual shooting in a natural manner. For example, the user is able to readily take photographs manually at arbitrary times, while also causing the photographic apparatus to take photographs automatically for use as a life log. Furthermore, the loss of a photographic opportunity due to the effort involved in switching to manual shooting is also prevented.

In addition, the photographic apparatus is able to realize operations respectively suitable for the automatic shoot mode and the manual shoot mode by switching the monitor display on and off, locking and unlocking the user-operable shutter element, and furthermore by modifying settings such as the image size and the compression ratio of the photographic image data to be saved.

DESCRIPTION OF THE PREFERRED EMBODIMENTS

Hereinafter, embodiments of the present invention will be described. The description hereinafter follows the order given below.

[1. Exemplary external view of the photographic apparatus]
[2. Exemplary configuration of the photographic apparatus]
[3. Photographic operation settings]
[4. Exemplary photographic process I]
[5. Exemplary photographic process II]
[6. Exemplary photographic process III]
[7. Exemplary photographic process IV]
[8. Exemplary photographic process V]
[9. Advantages of the embodiments and modifications]

1. Exemplary External View of the Photographic Apparatus

Figure 1:
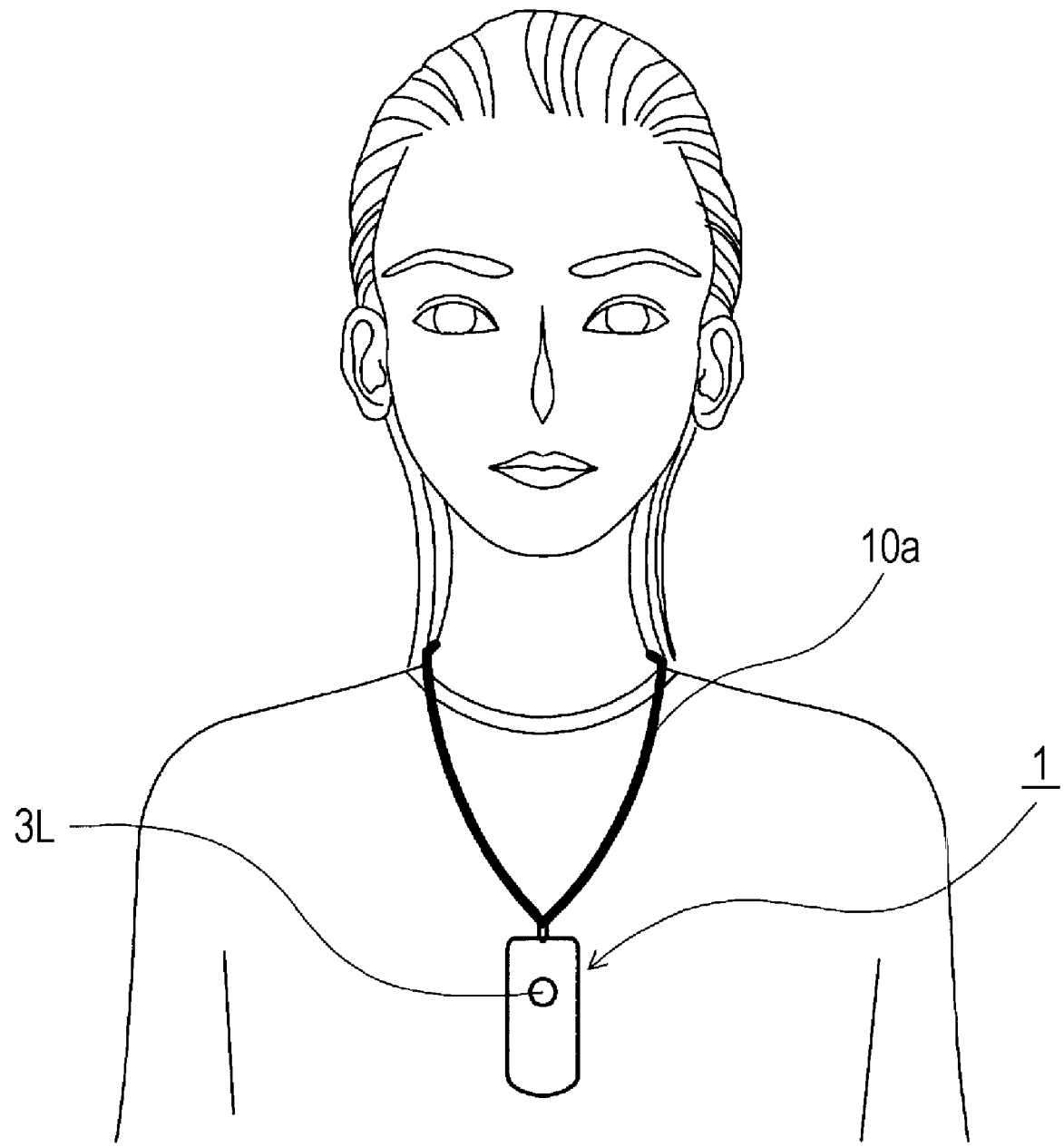
FIG. 1 is a diagram illustrating an exemplary exterior view of a photographic apparatus in accordance with an embodiment of the present invention.

A variety of forms may be envisioned for a photographic apparatus 1 in accordance with an embodiment of the present invention, and FIG. 1 illustrates one example thereof. FIG. 1 illustrates a photographic apparatus 1 that is worn around the neck. The photographic apparatus 1 of the present example includes, by way of example, a strap 10a attached to the main body of the apparatus. A user wears the photographic apparatus 1 by placing the strap 10a around his or her neck. The user may wear the photographic apparatus 1 such that a photographic lens 3 provided therein is able to take photographs directed at subjects in the user's forward direction.

Figure 2A:
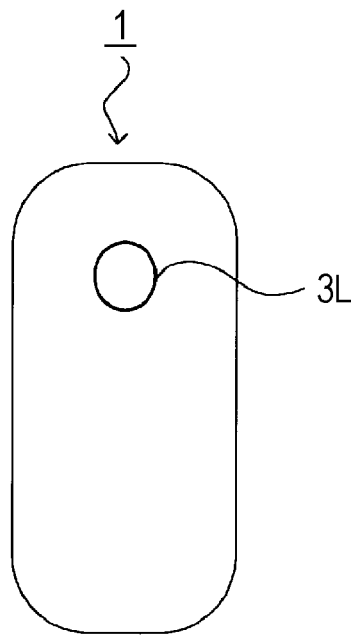
FIG. 2A is a diagram illustrating a front view of a photographic apparatus in accordance with an embodiment of the present invention.
Figure 2B:
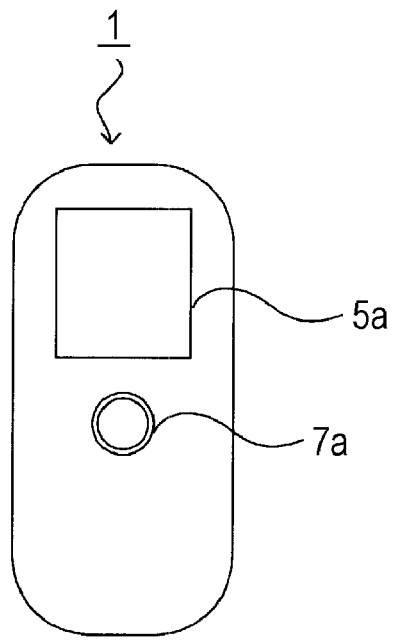
FIG. 2B is a diagram illustrating a rear view of a photographic apparatus in accordance with an embodiment of the present invention.

FIGS. 2A and 2B illustrate a front view and a rear view of the main body of the photographic apparatus 1. As shown in FIG. 2B, a display panel 5a and a shutter key 7a are provided on the back surface of the apparatus.

The display panel 5a is made up of an LCD (liquid-crystal display) panel or an OEL (organic electroluminescent) panel, for example.

The shutter key 7a is configured as a depressible switch, for example, and is used by the user to indicate the shutter timing.

When in manual shoot mode, the user operates the shutter key 7a, thereby causing photographic image data acquired at the time of the shutter operation to be saved within the photographic apparatus 1 as still image data equivalent to a single photograph.

When a photographic apparatus 1 like the above is being worn around the neck as shown in FIG. 1, then operations for automatic shoot mode may be conducted, such as the taking of photographs at regular intervals, for example.

In addition, operations for manual shooting are also executable. In other words, the user is able to take a photograph by arbitrarily performing a shutter operation. As shown by way of example in FIG. 2C, manual photography may be conducted as a result of the holding the main body of the photographic apparatus 1, deciding on a photographic subject while viewing the monitor display shown on the display panel 5a, and then pressing the shutter key 7a.

Herein, the monitor display shown by the display panel 5a is for enabling the user to decide on a photographic subject immediately prior to operating the shutter key 7a. For this reason, the monitor display displays successive images of the current photographic subject taken from the photographic lens 3L directly as video. The monitor display is thus similar to the display shown in an ordinary digital camera, and may also be referred to as a preview display.

In the description of an embodiment of the present invention herein, a photographic apparatus 1 that is worn around the neck as shown in FIGS. 1 and 2A to 2C is described by way of example. However, it should be appreciated that a diversity of configurations are conceivable with respect to features such as the external configuration of the photographic apparatus and the configuration whereby the user wears the photographic apparatus 1.

For example, the photographic apparatus 1 is also conceivable in an eyeglasses, headphones, neckband, or earpiece configuration. Moreover, the photographic apparatus 1 may also be configured to be worn by the user by attaching the apparatus to another worn object (such as an ordinary pair of eyeglasses, a visor, or a pair of headphones) using attachment fittings such as clips.

In addition, the photographic apparatus 1 may also be worn such that the photographic direction (i.e., the photographic direction for automatic shooting) does not face the user's forward direction. For example, configurations are conceivable wherein the photographic lens 3L is attached when worn so as to take photographs behind, above, or to the side of the user, or down toward the user's feet. Configurations are also conceivable wherein a plurality of photographic optics are provided that take photographs in the same or different directions.

Furthermore, a mechanism for varying the photographic direction may also be provided, thereby enabling manual or automatic variation of the photographic subject direction for one or a plurality of photographic lenses 3L.

In addition, the photographic apparatus 1 may also be used in a manner other than being attached to the user's body or clothing. For example, a vehicle-mountable photographic apparatus 1 able to take photographs inside or outside a vehicle is conceivable as a configuration of the present embodiment. Such a photographic apparatus may be mounted so as to photograph the interior of the vehicle cabin, or the forward or rearward scenery with respect to the vehicle, for example. In mounting positions such as the above, it is presumable that automatic shooting may be performed in addition to manual shooting performed as a result of the user taking the apparatus in hand and using the apparatus.

In addition, the photographic apparatus 1 in accordance with the present embodiment is also conceivable as a device provided with functions for use as a photographic apparatus, such as a mobile phone, PDA (personal digital assistant), or portable personal computer.

Furthermore, the various configurations given above may also be provided with a microphone that picks up external audio, for example, thereby enabling the acquisition of an audio signal to be recorded together with the image data when taking photographs. Additionally, the photographic apparatus 1 may also be configured to include a speaker unit or earphone unit for outputting audio.

In addition, it is also conceivable to provide a light-emitting unit such as an LED (light-emitting diode) in the vicinity of the photographic lens 3L in order to illuminate the direction of the photographic subject. Alternatively, a flash unit for still image photography may be provided.

2. Exemplary Configuration of the Photographic Apparatus

Figure 3:
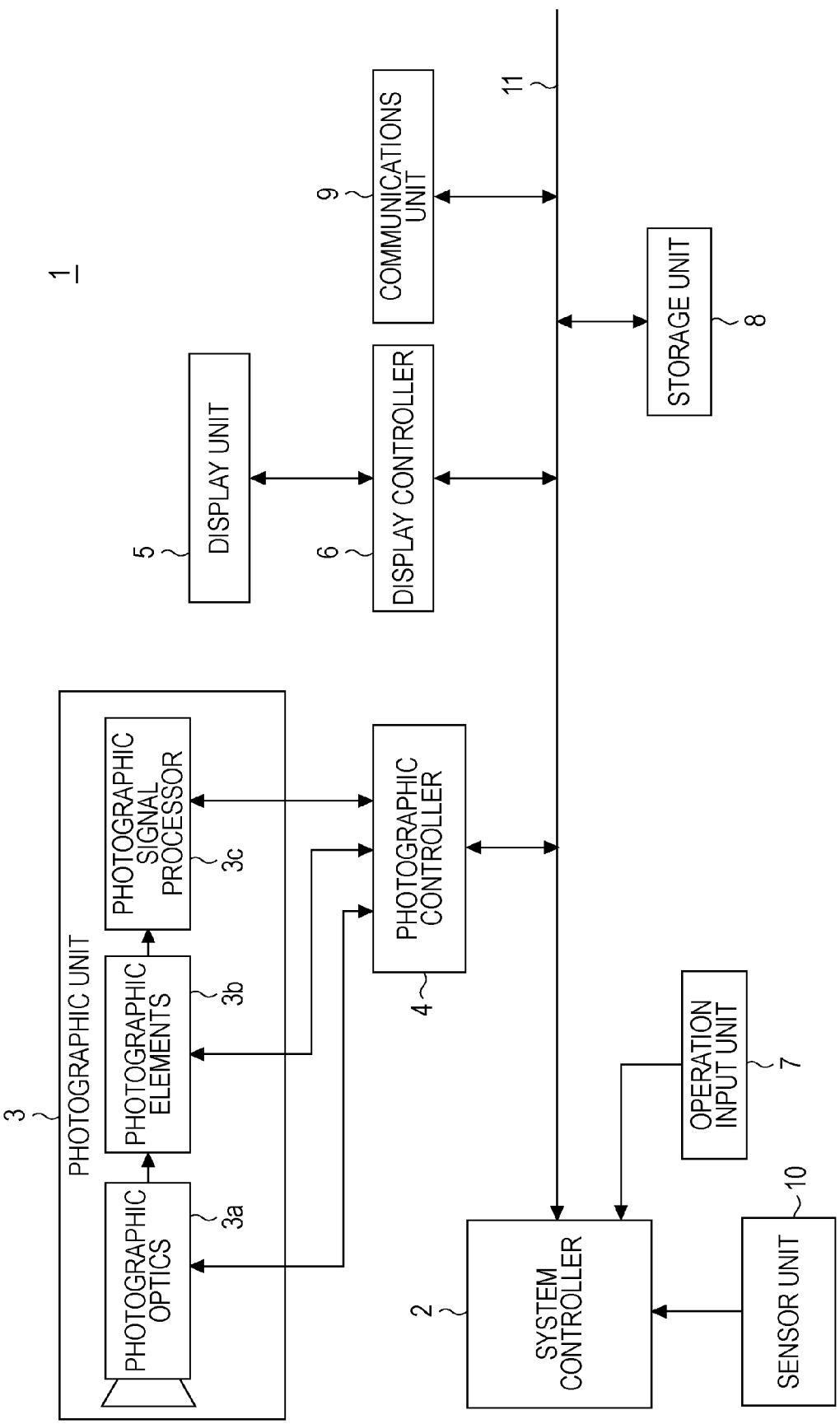
FIG. 3 is a block diagram for a photographic apparatus in accordance with an embodiment of the present invention.

An exemplary configuration of the photographic apparatus 1 in accordance with the present embodiment will now be described. FIG. 3 shows the internal configuration of a photographic apparatus 1.

As shown in FIG. 3, the photographic apparatus 1 includes a system controller 2, a photographic unit 3, a photographic controller 4, a display unit 5, a display controller 6, an operation input unit 7, a storage unit 8, a communications unit 9, and a sensor unit 10.

The system controller 2 is configured as a microprocessor including, for example, a CPU (central processing unit), ROM (read only memory), RAM (random access memory), non-volatile memory, and an interface. The system controller 2 conducts general control of the photographic apparatus 1. On the basis of a program stored in internal ROM or similar memory, the system controller 2 performs various computations and exchanges control signals or other information with other components via a bus 11, thereby causing the respective components to operate as desired.

In particular, the system controller 2 in the case of the present example conducts operations, such as switching between the automatic shoot mode and the manual shoot mode and controlling the configuration of various operational settings, on the basis of detected information supplied from the sensor unit 10. The above operations will be hereinafter described in detail.

The photographic unit 3 includes photographic optics 3a, photographic elements 3b, and a photographic signal processor 3c.

The photographic optics 3a of the photographic unit 3 include a lens system and a drive system or similar means. The lens system is configured to include a photographic lens 3L as shown in FIGS. 1 and 2A, an aperture, a zoom lens, a focus lens, and similar components. The drive system or similar means is used with respect to the lens system in order to conduct focus operations and zoom operations, for example.

The photographic elements 3b of the photographic unit 3 are provided as a solid-state imaging element array that detects image-forming light obtained by the photographic optics 3a, and then generates a photographic signal by subjecting the received light to photoelectric conversion. The solid-state imaging element array may be a CCD (charge-coupled device) sensor array or a CMOS (complementary metal oxide semiconductor) sensor array, for example.

The photographic signal processor 3c of the photographic unit 3 is provided with a sample-and-hold/AGC (automatic gain control) circuit that performs operations such as gain adjustment and waveform shaping with respect to a signal obtained by means of the solid-state imaging elements, as well as a video A/D converter. Using the above components, the photographic signal processor 3c obtains photographic image data in a digital format. Additionally, the photographic signal processor 3c may also subject the photographic image data to operations such as white balance processing, brightness processing, and color signal processing.

By means of the photographic optics 3a, the photographic elements 3b, and the photographic signal processor 3c included in the photographic unit 3, photographic imaging is conducted, and photographic image data is obtained as a result.

The image data obtained as a result of the imaging operations of the photographic unit 3 is subsequently processed by the photographic controller 4.

The photographic controller 4 processes the photographic image data in various ways in accordance with control by the system controller 2, performing operations such as image compression processing for compressing image data using various compression ratios, image size conversion, and image format conversion. Additionally, depending on operational conditions, the photographic controller 4 may also transfer photographic image data to destinations such as the storage unit 8, the display controller 6, and the communications unit 9.

For example, upon receiving a shutter timing from the system controller 2, the photographic controller 4 may execute desired processing with respect to a single frame of photographic image data and then transfer the processed photographic image data to the storage unit 8, the above processing being executed regardless of whether the photographic apparatus 1 is in the automatic shoot mode or the manual shoot mode. In addition, in manual shoot mode the display unit 5 is made to produce a monitor display, and thus while the photographic apparatus 1 is in manual shoot mode, the photographic controller 4 may also transfer the photographic image data obtained by the photographic unit 3 for each frame (or for frames at a given interval) to the display controller 6.

Furthermore, the photographic controller 4 may also, on the basis of instructions from the system controller 2, conduct operations to control parameters or configure process execution with respect to the various processes of the photographic signal processor 3c. Such operations may include on/off control with respect to the imaging operations conducted in the photographic unit 3, shutter processing, drive control of the zoom lens and the focus lens included in the photographic optics 3a, shutter speed control of the photographic elements 3b, and frame rate control.

The display unit 5 and the display controller 6 provided in the photographic apparatus 1 are configured to present various information to the user.

The display unit 5 is provided with a display panel 5a realized by means of an LCD display, OEL panel, or similar technology, as described above. The display unit 5 is also provided with a display drive unit that drives the display of the display panel 5a. The display drive unit is configured to include a pixel driving circuit for causing image data supplied from the photographic controller 4 to be displayed on the display panel 5a. The pixel driving circuit causes image data to be displayed by applying a drive signal to each pixel of a plurality of pixels arranged in a matrix in the display panel. The drive signal is based on a video signal, and is applied according to respectively determined horizontal and vertical drive timings.

On the basis of control by the system controller 2, the display controller 6 drives the pixel driving circuit in the display unit 5 to thereby realize a given display. For example, the above-described monitor display may be realized while in the manual shoot mode, or the display of an image retrieved from the storage unit 8 may be realized.

In addition, in order to realize the above displays, the display controller 6 is also able to conduct operations such as brightness level adjustment, color correction, contrast adjustment, and sharpness adjustment (i.e., edge enhancement). The display controller 6 is also able to process image data for various image effects, such as the generation of an enlarged image that magnifies a portion of the image data, the generation of a reduced image, soft focus, mosaic, the generation of a negative image, highlighting a portion of an image, and modifying the overall color tone.

The operation input unit 7 is provided with user-operable elements such as the shutter key 7a. Although only the shutter key 7a is illustrated in FIGS. 1 and 2A to 2C, there may also be provided user-operable elements for turning the power on and off, for performing operations related to automatic shooting, and for inputting various settings. The user-operable elements may include components such as keys, buttons, and dials.

Furthermore, user-operable elements related to manual shooting conducted in accordance with the user's shutter operations may also be provided. Such user-operable elements may be used for zoom operations, configuration of exposure settings, and self-timer operations, for example.

Moreover, such user-operable elements may also be realized by means other than physical keys. For example, a touch sensor may be provided in the display panel 5a, and the user-operable elements may be realized by performing touch operations with respect to the image display on the display panel 5a. Furthermore, cursor movement keys and a confirmation key may also be provided, thereby enabling a variety of operations by means of on-screen menu operations.

The operation input unit 7 supplies information obtained as a result of the above operations to the system controller 2. The system controller 2 subsequently executes appropriate computation and control corresponding to the supplied information.

The storage unit 8 is used to save photographic image data as well as various other types of data. The storage unit 8 may be realized by means of solid-state memory such as flash memory, or alternatively, by means of an HDD (hard disk drive), for example.

Additionally, a portable recording medium may be used instead of an internal recording medium. For example, the storage unit 8 may be realized by means of a read/write drive compatible with a memory card housing solid-state memory, an optical disc, a magneto-optical disk, holographic memory, or similar recording media.

Of course, the photographic apparatus 1 may also house both internal memory, such as solid-state memory or an HDD, as well as a read/write drive compatible with portable recording media.

On the basis of control by the system controller 2, the storage unit 8 reads and writes photographic image data as well as various other types of data.

The communications unit 9 is provided for the communication of data with various external equipment.

For example, the communications unit 9 may send and receive data to and from a server not shown in the drawings. In this case, the communications unit 9 may be configured to conduct network communication by means of short-range wireless communication with a network access point using a protocol such as wireless LAN or Bluetooth. Alternatively, the communications unit 9 may also conduct wireless communication directly with a server provided with compatible communications functions.

In addition, the communications unit 9 may also be configured to send and receive data by connecting to a device such as a personal computer using an interface such as USB (universal serial bus), for example.

By means of the communications unit 9, data such as photographic image data that has been imaged and stored in the storage unit 8 can be forwarded to a personal computer or other external device. Consequently, given a large amount of photographic image data that has accumulated in the storage unit 8 due to taking photographs at regular intervals for a life log, such data can not only be displayed for review on the display unit 5 of the photographic apparatus 1 itself, but also forwarded to one or more external devices such as a personal computer, and then displayed for review on the one or more external devices.

The sensor unit 10 detects intention information, such as user contact with the photographic apparatus 1 or movement of the photographic apparatus 1 itself, for example. The sensor unit 10 then supplies the detected intention information to the system controller 2.

The types of sensors used to constitute the sensor unit 10 differ depending on the operational examples to be hereinafter described. However, in the case where contact as a result of the user holding the main body of the photographic apparatus 1 is detected, sensors such as a pressure-sensitive sensor, a capacitance sensor, a heat-sensitive sensor that senses the user's body temperature, or a perspiration sensor may constitute the sensor unit 10. Alternatively, in the case where movement of the main body of the photographic apparatus 1 is detected, sensors such as an acceleration sensor, an angular velocity sensor, a magnetic sensor (i.e., a Hall element), or a load sensor may constitute the sensor unit 10.

3. Photographic Operation Settings

The photographic operational modes and mode-specific operational settings for a photographic apparatus 1 configured as above will now be described.

The photographic apparatus 1 in accordance with an embodiment of the present invention is able to execute both a manual shoot mode and an automatic shoot mode for photographic operations.

Photographic operations for the automatic shoot mode herein refer to operations for automatic shooting (i.e., recording photographic image data) that are conducted without involving a shutter operation by the user, such as the taking of photographs at regular intervals.

For example, automatic shooting is herein conceived as operations for still image photography that are conducted at a given interval (every one second, several seconds, or 10 seconds, for example) while the user is wearing a photographic apparatus 1 as shown in FIG. 1. It should be appreciated that, rather than shooting at regular intervals, shooting may also be conducted at irregular intervals, wherein automatic shooting is conducted according to timings corresponding to a given trigger (i.e., a trigger other than a user's shutter operation).

Photographic operations for manual shoot mode herein refer to operations for shooting (i.e., recording photographic image data) that are conducted as a result of a user's shutter operation. A shutter operation herein refers to an operation of the shutter key 7a that is performed as a result of the user's conscious will.

The automatic shoot mode is used for the purpose of creating a life log, for example.

In the present example, when the photographic apparatus 1 is in the automatic shoot mode, the system controller 2 controls settings such as the monitor display of the display unit 5, shutter settings, the image size, and the compression ratio as follows.

When the photographic apparatus 1 is set to automatic shoot mode, photographic image data is automatically acquired, and thus the user does not view the monitor display to confirm the photographic subject. For this reason, the system controller 2 causes the monitor display of the display unit 5 to be turned off.

In addition, while in automatic shoot mode the user does not operate the shutter key 7a. For this reason, the system controller 2 locks the shutter key 7a.

In addition, in an automatic shoot mode wherein photographs are taken at regular intervals, a large amount of photographic image data is generated and saved. Consequently, in consideration of the storage capacity of the storage unit 8, it is preferable to configure certain settings to reduce the data size, such as reducing the image size and setting a high compression ratio.

In contrast, the manual shoot mode involves operations for enabling the user to use the photographic apparatus 1 as an ordinary camera. When the photographic apparatus 1 is in the manual shoot mode, the system controller 2 controls settings such as the monitor display, shutter settings, the image size, and the compression ratio as follows.

More specifically, when in manual shoot mode, the user himself or herself decides on the subject to be photographed while viewing the monitor display. For this reason, the system controller 2 causes the display unit 5 to output the monitor display. Of course, the system controller 2 also unlocks the shutter key 7a.

In addition, the photographic image data acquired in manual shoot mode is presumably more important to the user than the photographic image data acquired in automatic shoot mode. Stated differently, photographic image data acquired in manual shoot mode represents an image of a photographic subject that the user actively desired to photograph. For this reason, the user may desire the highest available image quality. Consequently, the system controller 2 configures settings to increase the image size and set a low compression ratio for (or leave uncompressed) the photographic image data.

A representative usage of the photographic apparatus 1 in accordance with the present embodiment involves taking photographs at regular intervals in automatic shoot mode while the photographic apparatus 1 is worn by the user as shown in FIG. 1.

As automatic shooting is conducted while the user wears the photographic apparatus 1 during his or her daily activities, scenes of the user's activity are automatically photographed.

Life log images are thus automatically shot and saved by the photographic apparatus 1 as the user performs various activities. However, when the user encounters a scene that he or she particularly desires to photograph, the user desires to take a photograph by manually deciding on the photographic subject and then performing a shutter operation.

In such a case, the user takes the photographic apparatus 1 in hand, points the photographic lens 3L in the direction of the photographic subject, and then arbitrarily times the pressing of the shutter key 7a while confirming the photographic subject using the monitor display shown on the display panel 5a.

The present embodiment is configured such that when a situation such as the above occurs, the system controller 2 judges the photographic intent of the user and switches the photographic apparatus 1 to manual shoot mode, without the user performing a specific operation to switch from automatic shoot mode to manual shoot mode.

More specifically, in response to a user attempting to manually photograph a scene, the monitor display on the display panel 5a is turned on, and the operational lock on the shutter key 7a is released. Subsequently, if the shutter key 7a is operated, the photographic image data acquired at the timing of the shutter operation is saved as still image data, with settings such as the image size and the compression ratio being configured for higher image quality than that of the automatic shoot mode.

Hereinafter, operations like the above will be described as exemplary photographic processes I to V. More particularly, exemplary processes for realizing operations to judge the photographic intent of the user and switch to the manual shoot mode will be respectively described.

4. Exemplary Photographic Process I

The exemplary photographic process I involves judging the intent of the user (i.e., judging the user's intent to manually perform a shutter operation) by means of a trigger whereby the photographic apparatus 1 is switched from automatic shoot mode to manual shoot mode. In the photographic process I, the judgment involves determining whether or not the user has been in physical contact with a grip portion on the main body of the photographic apparatus 1 for at least a predetermined amount of time. In other words, the intention judgment is the determination of whether or not the user has been holding the photographic apparatus 1 for at least a predetermined amount of time.

Figure 4A:
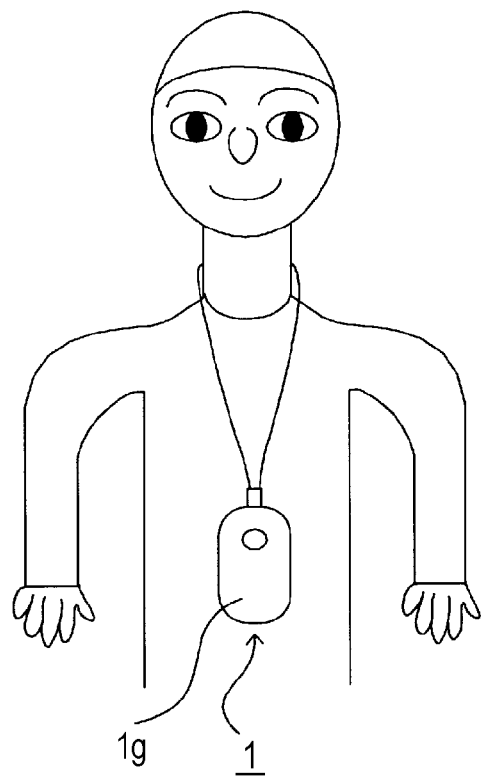
FIG. 4A is a diagram illustrating how a grip portion is held in accordance with an embodiment of the present invention.
Figure 4B:
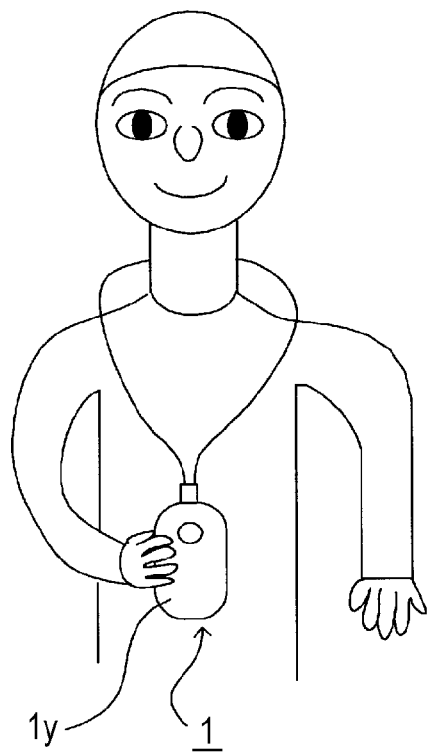
FIG. 4B is a diagram illustrating how a grip portion is held in accordance with an embodiment of the present invention.

The user may ordinarily wear the photographic apparatus 1 as shown by way of example in FIG. 4A and cause automatic shooting to be executed. During this state, the user may encounter a particular subject that he or she actively desires to photograph. In this case, the user may hold a grip 1g of the photographic apparatus 1 as shown in FIG. 4B, and continue to hold the grip 1g for some amount of time.

More specifically, the user may grasp the grip 1g, point the photographic apparatus 1 at a photographic subject, and subsequently operate the shutter key 7a.

Figure 2C:
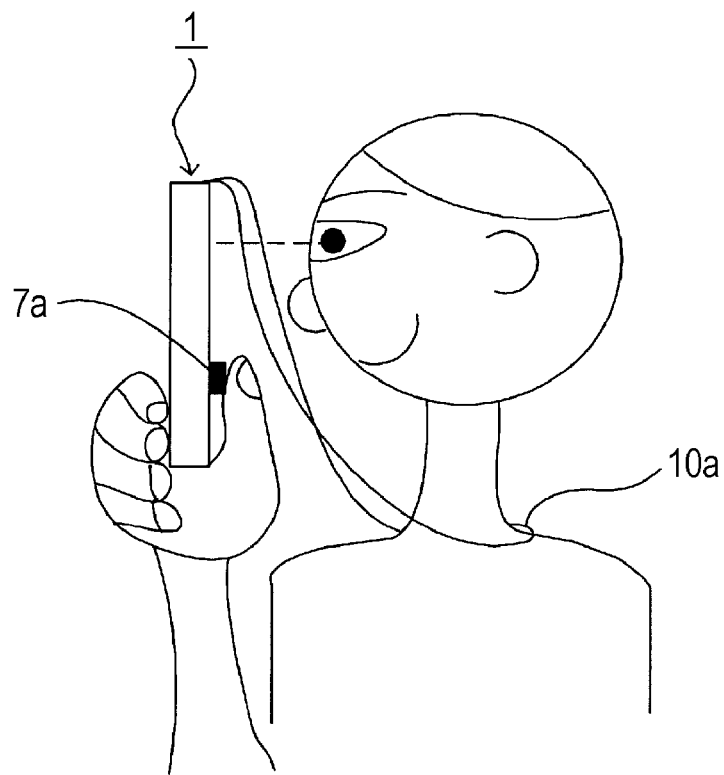
FIG. 2C is a diagram illustrating how a photographic apparatus is used in accordance with an embodiment of the present invention.

The grip 1g herein refers a location naturally contacted by the user's hand when the photographic apparatus 1 is held in a manner enabling the user to operate the shutter key 7a, as shown by way of example in FIG. 2C.

When manually taking a photograph, the user performs actions that involve holding the photographic apparatus 1, and thus the user naturally contacts the grip 1g for some amount of time. In contrast, fleeting contact is unlikely to constitute an intent to take a photograph. Accidental touches are of course also possible.

For this reason, the user may be judged to have photographic intent if it is detected that the user has performed actions that involve grasping the photographic apparatus 1 for at least a predetermined amount of time.

Consequently, a configuration equivalent to the sensor unit 10 shown in FIG. 3 may involve mounting, on the surface of the grip 1g, a capacitance sensor that detects changes in capacitance, a pressure-sensitive sensor that detects changes in pressure, or a temperature sensor that senses body temperature.

If the detection of contact from the sensor unit 10 is then sustained for at least a predetermined amount of time, then the system controller 2 may judge that the user is holding the photographic apparatus 1 (and thus has a photographic intent), and then the system controller 2 may conduct a control to switch the photographic apparatus 1 to manual shoot mode.

However, if a large amount of time is set between the initiation of contact with the grip 1g and the switching to manual shoot mode, then the user's desired photographic opportunity may be lost. Consequently, the predetermined amount of time for the purpose of judging sustained contact is set to be an amount of time whereby fleeting contact and grasping contact can be distinguished. For example, an amount of time from two to several seconds may be considered a reasonable duration.

Figure 5:
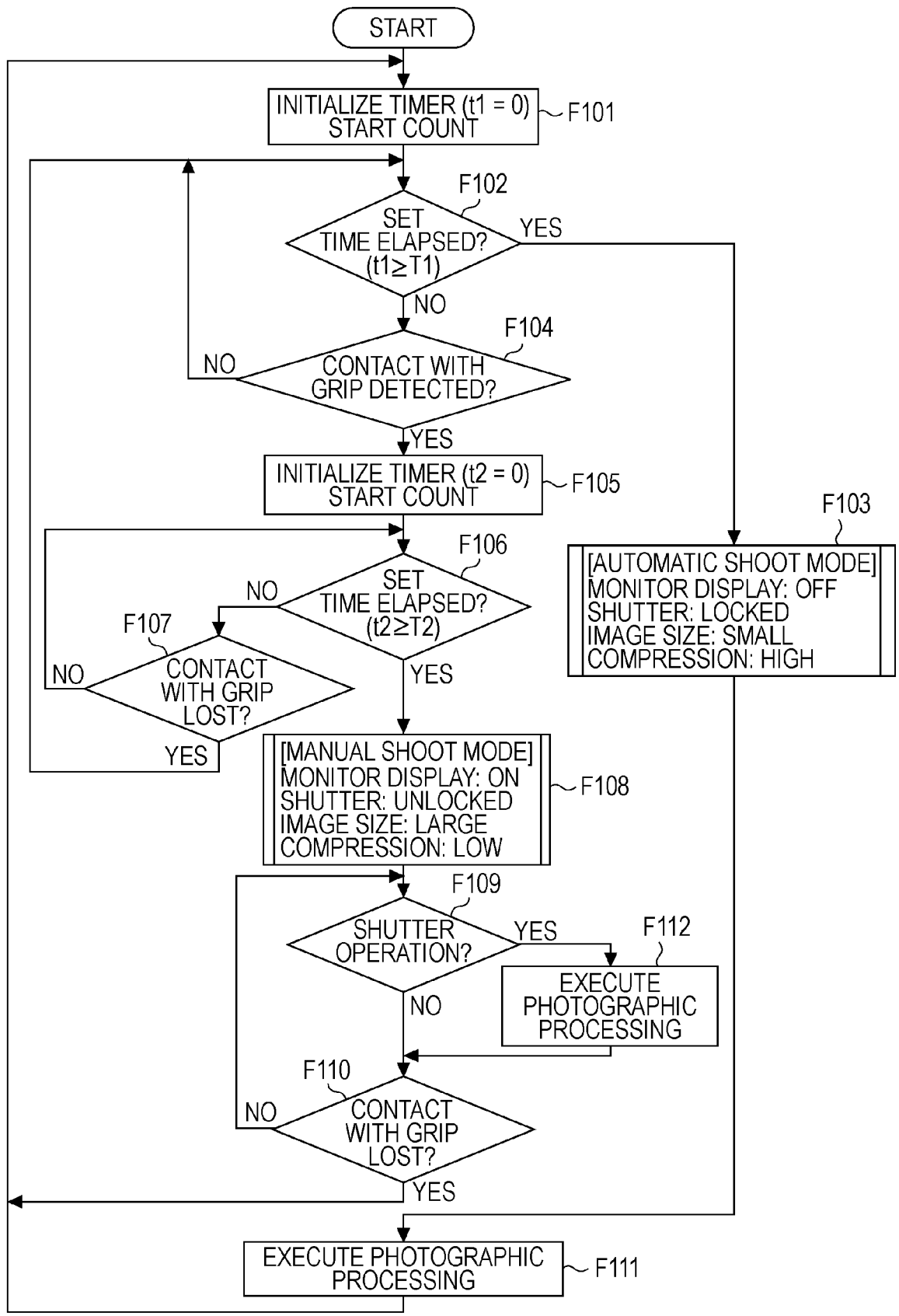
FIG. 5 is a flowchart for an exemplary photographic process I in accordance with an embodiment of the present invention.

Processing by the system controller 2 for realizing operation like the above is illustrated in FIG. 5.

FIG. 5 shows control processing executed by the system controller 2 on the basis of a program stored in internal ROM. Furthermore, the processing shown is that conducted after the initiation of operation in automatic shoot mode for shooting still images at regular intervals. The above two conditions also apply to the processing illustrated in FIGS. 7, 9, 10, and 14, to be hereinafter described.

While automatic shooting is being executed, the system controller 2, using an internal timer for example, keeps a time count that measures a predetermined shooting interval. With every count of the predetermined amount of time (every 10 seconds, for example), photographic operations are executed. More specifically, the system controller 2 causes the photographic controller 4 to subject photographic image data obtained by the photographic unit 3 to compression or similar processing, and then transfer the processed data to the storage unit 8. The system controller 2 then causes the storage unit 8 to execute operations for saving the transferred photographic image data as a still image.

Automatic shooting is thus executed as a result of the system controller 2 issuing instructions for photographic operations like the above at predetermined time intervals, for example. However, while automatic shooting is being executed, the system controller 2 continually executes the processing shown in FIG. 5, thereby executing continuous processing to modify settings for photographic operation.

While automatic shooting is being executed as above, in step F101 the system controller 2 initializes a timer t1 for controlling the automatic shooting interval by setting t1=0, and additionally starts the count.

Subsequently, in step F102, the system controller 2 determines whether or not a predetermined amount of time T1 has elapsed by using the count from the timer t1.

In addition, in step F104, the system controller 2 acquires detected information from the sensor unit 10, and then confirms whether or not contact with the grip 1g has been detected.

If no particular contact is detected, then the process proceeds from step F102 to step F103 once the amount of time T1 has elapsed.

In step F103, the system controller 2 configures settings for photographic operation in accordance with the automatic shoot mode. Alternatively, the system controller 2 maintains the settings for automatic shoot mode.

More specifically, the system controller 2 conducts control both to turn off output of the monitor display and to lock the shutter key 7a. In addition, the system controller 2 issues instructions causing the photographic controller 4 to execute configuration processing to set small image size and high compression ratio settings. (Alternatively, the configuration processing may maintain the above settings.)

Subsequently, the system controller 2 proceeds to step F111 and executes photographic processing. More specifically, the system controller 2 issues instructions causing the photographic controller 4 to acquire and process photographic image data as still image data (i.e., signal processing is executed to yield a small image size and high compression ratio). The instructions also cause the photographic controller 4 to subsequently transfer the photographic image data to the storage unit 8, while also causing the storage unit 8 to save the photographic image data therein.

As a result, photographic operation for the automatic shoot mode is conducted, whereby still image data for a single photograph is acquired and saved.

Upon conducting the photographic operational control as described above, the system controller 2 returns again to step F101, whereby the timer t1 is reset and the count restarted.

As long as the operations for automatic shoot mode are sustained, processing is conducted as described above, proceeding to step F101, step F102, step F103, step F111, and then back to step F101 according to a regular interval (i.e., the interval T1). As a result, automatic shooting is conducted.

However, if the user contacts the grip 1g while the above operations for automatic shoot mode are being conducted, then the system controller 2 detects such contact in step F104, and subsequently proceeds to step F105. At that point, the system controller 2 initializes a timer t2 used to make an intention judgment, and starts a count. More specifically, the system controller 2 initializes the measurement of the contact time with the grip 1g.

In the subsequent step F106, the system controller 2 determines whether or not the count of the timer t2 has reached a predetermined amount of time T2.

Subsequently, in step F107, the system controller 2 uses detected information from the sensor unit 10 to determine whether or not contact with the grip 1g has been lost.

The processing conducted in steps F106 and F107 is for determining whether or not the grip 1g was contacted continuously for at least the predetermined amount of time T2. For example, if the user unconsciously touches the grip 1g, then there may be fleeting contact without specific photographic intent. Consequently, the above processing judges whether the user grasped the grip 1g with an intent to manually take a photograph, or merely touched the grip 1g by accident.

If it is determined in step F107 that contact was lost before the predetermined amount of time T2 had elapsed in step F106, then the system controller 2 judges that the contact was merely an accidental touch, and that the user has no photographic intent. In this case, the system controller 2 returns to step F102, and the processing for automatic shoot mode is maintained.

In contrast, if a judgment result is obtained indicating that the predetermined amount of time did elapse in step F106, then the user has been grasping the grip 1g continuously for at least the predetermined time T2 (the predetermined time T2 being, for example, from two to several seconds, as described above). Consequently, the system controller 2 judges that the user has a photographic intent.

The system controller 2 then proceeds to step F108 and configures settings for photographic operation in accordance with the manual shoot mode. In this case, the system controller 2 turns on the monitor display, releases the operational lock on the shutter key 7a, and additionally issues instructions causing the photographic controller 4 to execute processing to configure settings for large image size and low compression ratio.

Subsequently, in step F109, the system controller 2 waits for a shutter operation (i.e., an operation of the shutter key 7a). Additionally, in step F110, the system controller 2 uses detected information from the sensor unit 10 to determine whether or not contact with the grip 1g is being maintained. If contact is being maintained, the process returns to step F109.

In other words, as long as the user continues to hold the grip 1g, the system controller 2 judges that the user is deciding on the photographic subject and waits for operation of the shutter key 7a.

Subsequently, if operation of the shutter key 7a is detected, then the photographic processing operations in step F112 are conducted. More specifically, the system controller 2 issues instructions causing the photographic controller 4 to acquire and process photographic image data as still image data (i.e., execute processing to yield a large image size and low compression ratio). The instructions also cause the photographic controller 4 to subsequently transfer the photographic image data to the storage unit 8, while also causing the storage unit 8 to save the photographic image data therein.

As a result, photographic operation for the manual shoot mode is conducted, whereby still image data for a single photograph is acquired and saved.

As long as contact with the grip 1g is continuously confirmed in step F110, the photographic processing in step F112 is executed each time the shutter key 7a is operated, and thus still image data is recorded in the storage unit 8.

In other words, the processing for manual shoot mode is maintained as long as the user is holding the grip 1g.

If the system controller 2 determines in step F110 that contact with the grip 1g has been lost, then the system controller 2 returns to step F101 and transitions to processing for automatic shoot mode. The above is conducted if loss of contact is detected after manual shooting is conducted at least once as a result of operating the shutter key 7a, or even if the shutter key 7a is not operated at all.

Subsequently, the process proceeds to step F103 once the predetermined amount of time T1 has elapsed, settings are switched in accordance with the automatic shoot mode, and the processing for automatic shooting in step F111 is conducted.

In this way, the photographic apparatus 1 in accordance with the present embodiment is configured such that, if the user has been holding the grip 1g for at least a predetermined amount of time (T2) while automatic shooting is being conducted, then it is judged that the user intends to manually take a photograph. Consequently, the photographic apparatus 1 is switched from an automatic shoot mode to a manual shoot mode, and photographic processing is executed in response to operation of the shutter key 7a.

In so doing, the user is able to manually take photographs by operating the shutter key 7a at arbitrary timings while also causing the photographic apparatus 1 to shoot photographs for a life log in an automatic shoot mode, and furthermore without the user paying particular attention to the operational mode of the photographic apparatus 1.

5. Exemplary Photographic Process II

An exemplary photographic process II will now be described. In the photographic process II, the user's intent to manually take a photograph is judged by determining whether or not the main body of the photographic apparatus 1 has moved in a predetermined direction, and if such movement is detected, determining whether or not the photographic apparatus 1 has been stationary for at least a predetermined amount of time.

Figure 6A:
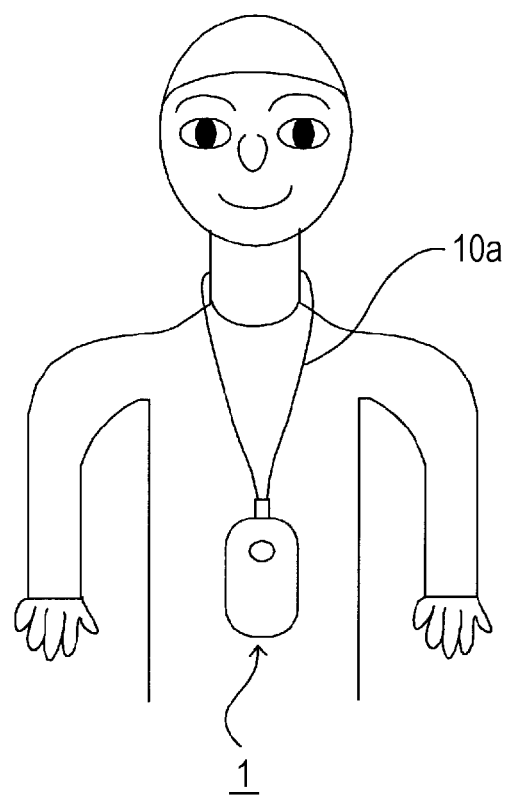
FIG. 6A is a diagram illustrating upward movement of a photographic apparatus in accordance with an embodiment of the present invention.
Figure 6B:
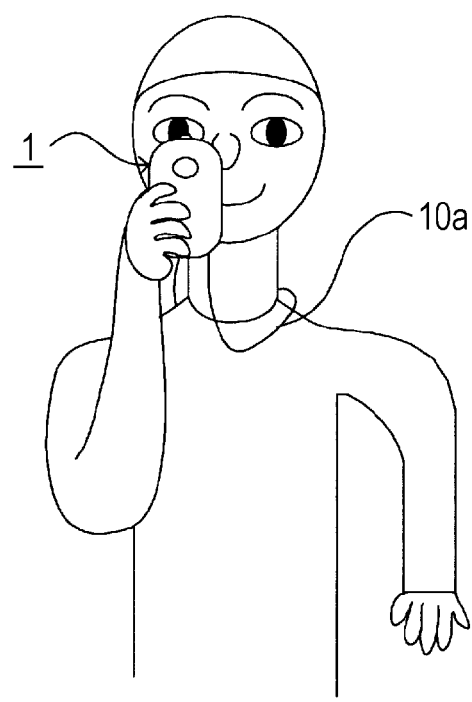
FIG. 6B is a diagram illustrating upward movement of a photographic apparatus in accordance with an embodiment of the present invention.

For example, consider the case wherein the user holds the main body of the photographic apparatus 1 and moves the photographic apparatus 1 upward from its normal worn position as shown in FIG. 6A to the position as shown in FIG. 6B (i.e., in front of the user's face), and furthermore, the user then holds the photographic apparatus 1 in a stationary state for at least a predetermined amount of time. In this case, the photographic apparatus 1 judges that the user has a photographic intent, and subsequently switches from the automatic shoot mode to the manual shoot mode.

While automatic shooting is being conducted with the photographic apparatus 1 in its normal worn position as shown in FIG. 6A, the user does not have a specific photographic intent, and thus the photographic apparatus 1 swings and stops naturally in an indeterminate manner according to the user's actions (such as the user walking, for example).

In contrast, when the user is attempting to intentionally take a photograph, the user typically shoots while physically viewing the monitor display shown by the display unit 5. For this reason, the user lifts the photographic apparatus 1 upward. Furthermore, when taking a photograph manually, the user holds the photographic apparatus 1 still (in front of the face, example) for some amount of time (at least one to three seconds, for example) until the user decides on the photographic subject.

Consequently, in the exemplary photographic process II, the user's intent to manually take a photograph is inferred in the case where the user moves the photographic apparatus 1 upward from its normal worn position, and subsequently holds the photographic apparatus 1 still for at least a predetermined amount of time. When the above is detected, the photographic apparatus 1 switches from automatic shoot mode to manual shoot mode.

Although there do exist cases wherein the user may unintentionally and momentarily lift up the photographic apparatus 1, as well as cases wherein the photographic apparatus 1 may be moved upward due to the user's actions (such as the user running or jumping, for example), the photographic apparatus 1 is typically not stationary after such movement. For this reason, by defining the judgment parameter as being movement upward and a subsequent stationary state for a predetermined amount of time, the user's photographic intent can be inferred fairly accurately.

Herein, the "stationary state" for a predetermined amount of time is the state detected wherein the user is holding the photographic apparatus 1 and not moving. For this reason, it is preferable that the "stationary state" also include movement such as that due to slight movements of the hands and a degree of fluctuation in the orientation of the photographic apparatus 1.

Additionally, in order for the photographic apparatus 1 to detect its own movement and stationary state as described above, the sensor unit 10 described with reference to FIG. 3 may be configured to sense the magnitude and direction of induced movement. For example, sensors such as an acceleration sensor, an angular velocity sensor, or a vibration sensor may be provided as the sensor unit 10, while the system controller 2 may be configured to sense movement of the photographic apparatus 1.

Figure 7:
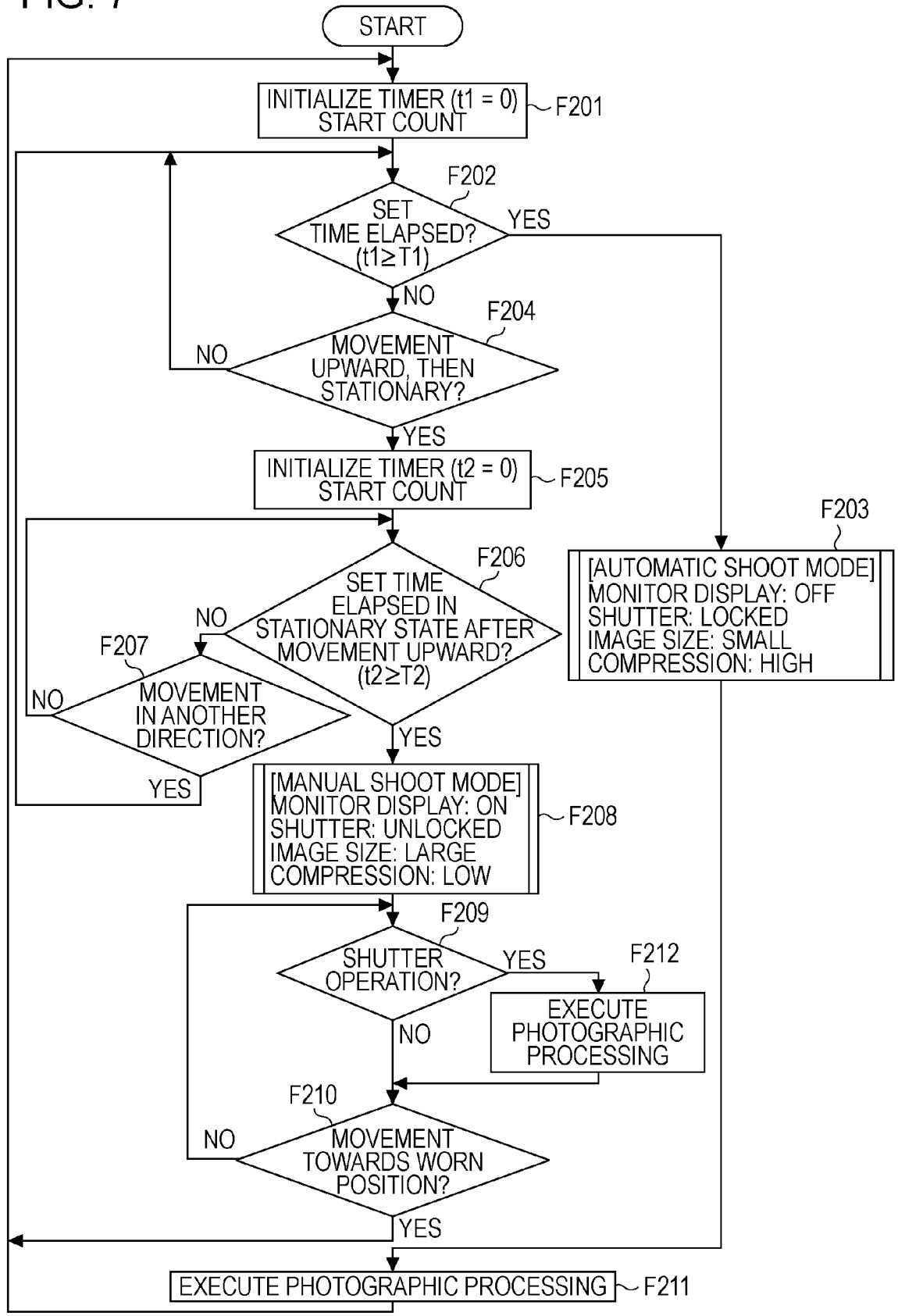
FIG. 7 is a flowchart for an exemplary photographic process II in accordance with an embodiment of the present invention.

The flowchart in FIG. 7 illustrates an exemplary processing sequence conducted by the system controller 2 for realizing the exemplary photographic process II.

The processing indicated in steps F201, F202, F203, and F211 in FIG. 7 is identical to the processing for the automatic shoot mode that was described with reference to FIG. 5 (F101, F102, F103, and F111), and for this reason, a repetition of the description of this processing is avoided herein.

While waiting for the predetermined amount of time T1 to elapse in step F202 as part of the automatic shoot mode, the system controller 2 continuously makes judgments in step F204 for determining whether or not the photographic apparatus 1 has moved upward and is now stationary.

Using detected information from the sensor unit 10, if it is sensed that the photographic apparatus 1 has moved upward, and in addition, is now relatively stationary at the upward position, then the system controller 2 proceeds to step F205, initializes a timer t2, and starts a count. The timer count is used to initiate measurement of the amount of time the photographic apparatus 1 remains stationary after being moved upward (i.e., to a position in front of the user's face).

Furthermore, in order to correctly sense movement before the stationary state, a positive detection result is not returned in step F204 in the case where movement is detected indicating that the photographic apparatus 1 has been moved vertically due to swaying of the user's body, for example.

In step F206, the system controller 2 monitors the counter of the timer t2 to determine whether or not the predetermined amount of time T2 has elapsed. In other words, the system controller 2 determines whether or not an amount of time T2 has elapsed with the photographic apparatus 1 in a stationary state. The predetermined amount of time T2 may be set to approximately one to three seconds, for example.

In addition, in step F207, movement toward the worn position is detected. More specifically, the system controller 2 uses detected information from the sensor unit 10 to determine whether or not there occurs a downward movement approximately equal in distance to the upward movement that was detected in step F204.

The processing in steps F206 and F207 is thus conducted to determine whether or not the user is holding the photographic apparatus 1 still at a position such as in front of the user's face. In other words, the above processing is conducted in order to distinguish between, for example, the user lifting up the photographic apparatus 1 to stop wearing the apparatus or simply for no particular reason at all, and the user lifting up the photographic apparatus 1 with a specific photographic intent.

When the user has no specific photographic intent, the stationary state immediately after the movement upward is typically not sustained for the amount of time T2 or longer, and in step F207 movement in the direction of the worn position (i.e., downward) may be sensed. Alternatively, if the user is still holding the photographic apparatus 1, then movement in a different direction may be sensed.

In this case, the user is judged to have no specific photographic intent, and the process returns to step F202.

In some cases, the user may move the photographic apparatus 1 a large amount while holding the apparatus in order to decide on the direction in which to take a photograph. In such cases, the system controller 2 may be configured to proceed to step F205 upon detecting in step F204 that the photographic apparatus 1 has returned to a stationary state after being moved such that the vertical position of the photographic apparatus 1 is maintained (i.e., the photographic apparatus 1 is not moved vertically).

If the photographic apparatus 1 remains in a stationary state at a position above the worn position shown in FIG. 6A for at least the predetermined amount of time T2, then the system controller 2 judges that the user has a photographic intent, and in the subsequent step F208 configures settings for photographic operation in accordance with the manual shoot mode. More specifically, the system controller 2 turns on the monitor display, releases the operational lock on the shutter key 7a, and additionally issues instructions causing the photographic controller 4 to execute processing to configure settings for large image size and low compression ratio.

Subsequently, in step F209, the system controller 2 waits for a shutter operation (i.e., an operation of the shutter key 7a). Additionally, in step F210, the system controller 2 uses detected information from the sensor unit 10 to determine whether or not movement in the direction of the worn position (i.e., movement downward) has occurred. If no movement downward has occurred, the process returns to step F209.

In other words, as long as the user continues to hold the photographic apparatus 1 and point at a photographic subject, the system controller 2 waits for operation of the shutter key 7a.

Subsequently, if operation of the shutter key 7a is detected, then the photographic processing operations in step F212 are conducted. More specifically, the system controller 2 issues instructions causing the photographic controller 4 to acquire and process photographic image data as still image data (i.e., execute processing to yield a large image size and low compression ratio). The instructions also cause the photographic controller 4 to subsequently transfer the photographic image data to the storage unit 8, while also causing the storage unit 8 to save the photographic image data therein.

As a result, photographic operation for the manual shoot mode is conducted, whereby still image data for a single photograph is acquired and saved.

If movement toward the worn position is sensed in step F210, then the system controller 2 returns to step F201 and transitions to processing for automatic shoot mode. The above is conducted if the movement is sensed after manual shooting is conducted at least once as a result of operating the shutter key 7a, or even if the shutter key 7a is not operated at all. Subsequently, the process proceeds to step F203 once the predetermined amount of time T1 has elapsed, settings are switched in accordance with the automatic shoot mode, and the processing for automatic shooting in step F211 is conducted.

In this way, if the user moves the photographic apparatus 1 upward and then holds the photographic apparatus 1 in a stationary state while automatic shooting is being conducted, then it is judged that the user intends to manually take a photograph. Consequently, the photographic apparatus 1 is switched from an automatic shoot mode to a manual shoot mode, and photographic processing is executed in response to operation of the shutter key 7a.

In so doing, the user is able to manually take photographs by operating the shutter key 7a at arbitrary timings while also causing the photographic apparatus 1 to shoot photographs for a life log in an automatic shoot mode, and furthermore without the user paying particular attention to the operational mode of the photographic apparatus 1.

6. Exemplary Photographic Process III

An exemplary photographic process III will now be described.

In the photographic process III, the user's photographic intent is inferred as a result of determining that the photographic apparatus 1 has moved from its worn position, and upon detecting such movement, determining that the photographic apparatus 1 has been stationary for at least a predetermined amount of time.

Figure 8A:
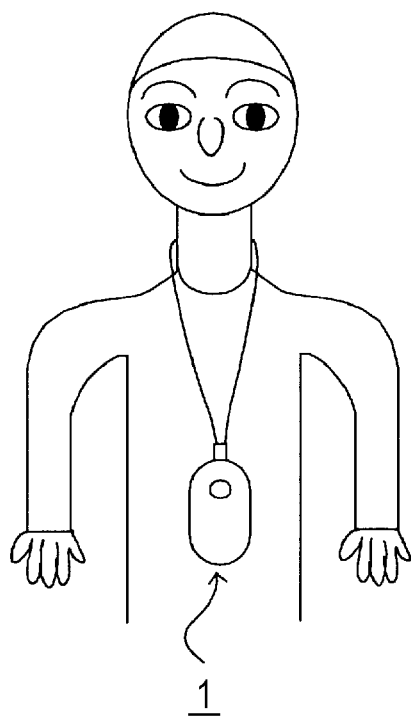
FIG. 8A is a diagram illustrating movement of a photographic apparatus and detection of magnetic force in accordance with an embodiment of the present invention.
Figure 8B:
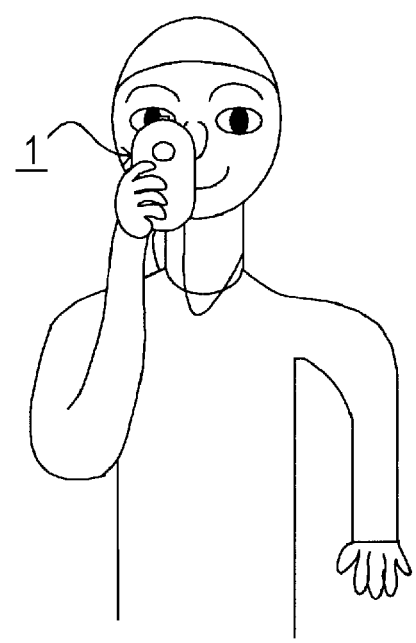
FIG. 8B is a diagram illustrating movement of a photographic apparatus and detection of magnetic force in accordance with an embodiment of the present invention.
Figure 8C:
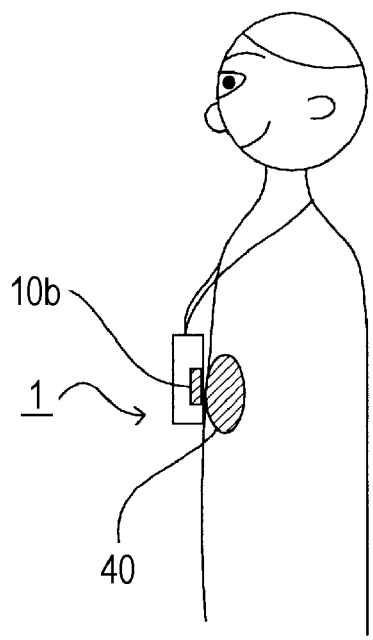
FIG. 8C is a diagram illustrating movement of a photographic apparatus and detection of magnetic force in accordance with an embodiment of the present invention.
Figure 8D:
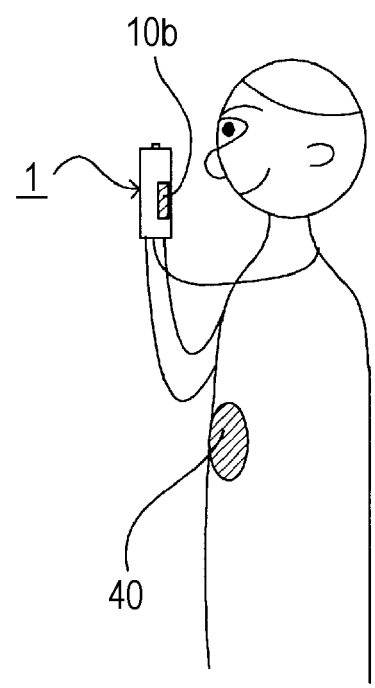
FIG. 8D is a diagram illustrating movement of a photographic apparatus and detection of magnetic force in accordance with an embodiment of the present invention.

FIGS. 8A and 8C illustrate the normal worn position of the photographic apparatus 1, while FIGS. 8B and 8D illustrate the state wherein the user is attempting to manually take a photograph.

In this case, the sensor unit 10 of the photographic apparatus 1 is provided with a magnetic sensor such as a Hall element 10*b* in addition to an acceleration sensor or similar sensor for determining when the photographic apparatus 1 is stationary. In addition, a unit including a magnet 40 is provided, the unit being attachable to the user's clothing, for example, at a location near the normal worn position of the photographic apparatus 1.

In so doing, when the photographic apparatus 1 is in the normal worn position as shown in FIGS. 8A and 8C, magnetic force is detected by the Hall element 10*b*, thereby enabling the system controller 2 to detect that the photographic apparatus 1 is present at the worn position. In contrast, if the photographic apparatus 1 moves away from the worn position, the magnetic force ceases to be detected by the Hall element 10*b*, and as a result the system controller 2 is able to determine that the photographic apparatus 1 has moved to a non-worn position.

However, due to bodily swaying that accompanies the user's actions, the photographic apparatus 1 may move to non-worn positions.

Consequently, in the photographic process III, movement to a non-worn position is sensed as a loss of magnetic force detected by the Hall element 10*b*, with an additional condition being the maintenance of a stationary state at the non-worn position. Upon detecting the above conditions, the user is inferred to have a photographic intent. The user's intent is inferred in this way to recognize that when the user attempts to manually take a photograph as shown by way of example in FIGS. 8B and 8D, the user points the photographic apparatus 1 at a photographic subject and typically holds the apparatus in a stationary state for some amount of time.

Figure 9:
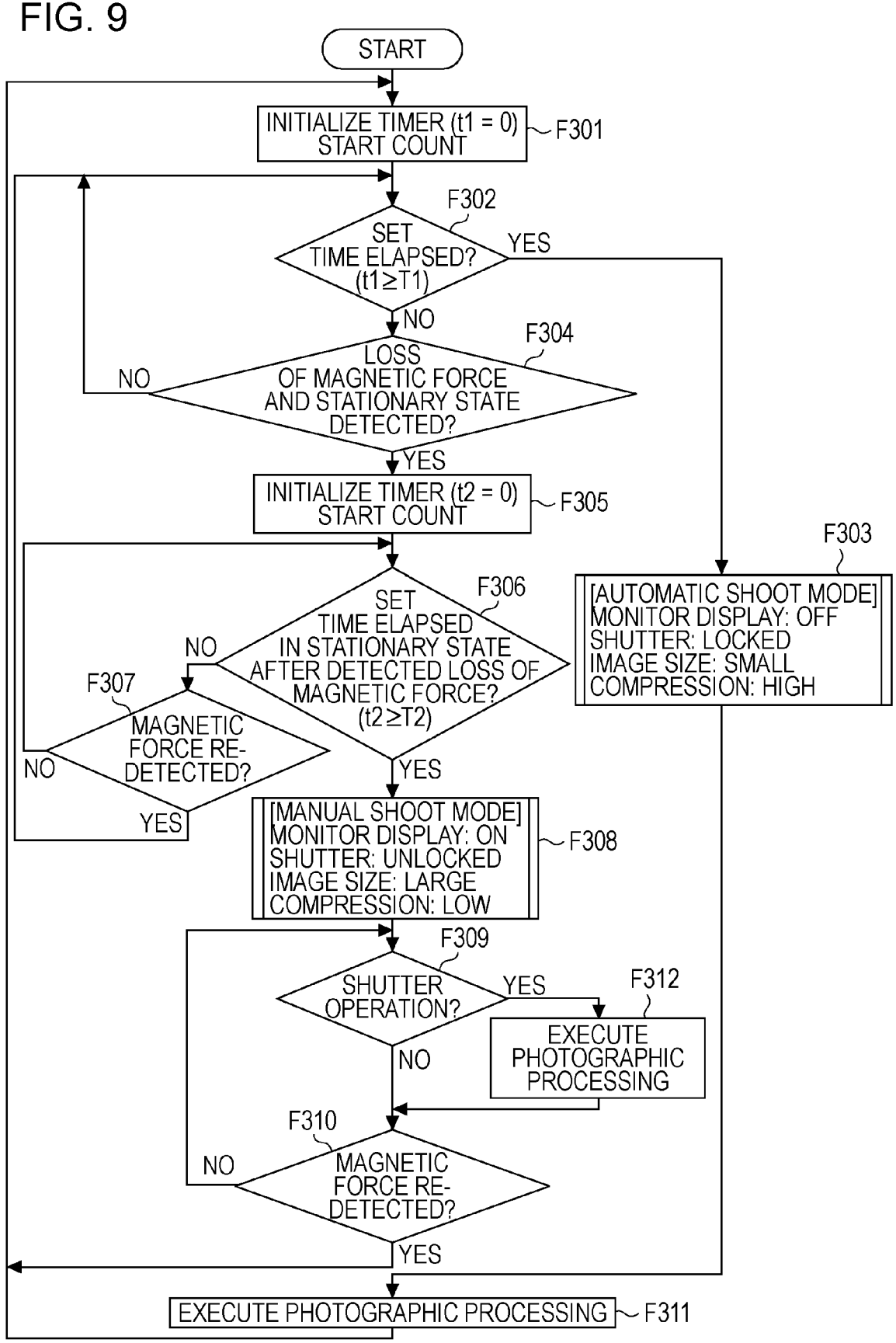
FIG. 9 is a flowchart for an exemplary photographic process III in accordance with an embodiment of the present invention.

The flowchart in FIG. 9 illustrates a processing sequence conducted by the system controller 2 for realizing the exemplary photographic process III.

The processing indicated in steps F301, F302, F303, and F311 in FIG. 9 is identical to the processing for the automatic shoot mode that was described with reference to FIG. 5 (F101, F102, F103, and F111), and for this reason, a repetition of the description of this processing is avoided herein.

Herein, a Hall element 10*b* and an acceleration or similar sensor are provided as the sensor unit 10 described above.

While waiting for the predetermined amount of time T1 to elapse in step F302 as part of the automatic shoot mode, in step F304 the system controller 2 monitors the detection of magnetic force by the Hall element 10*b* as well as the detection of movement by the acceleration or similar sensor, and determines whether or not the detected magnetic force has been lost (i.e., the photographic apparatus 1 has moved to a non-worn position) and whether or not the photographic apparatus 1 is now in a stationary state.

Using detected information from the sensor unit 10, if it is sensed that the photographic apparatus 1 has moved to a non-worn position and additionally is now relatively stationary at the non-worn position, then the system controller 2 proceeds to step F305, initializes a timer t2, and starts a count. The timer count is used to initiate measurement of the amount of time the photographic apparatus 1 remains stationary after being moved to the non-worn position.

In step F306, the system controller 2 monitors the counter of the timer t2 to determine whether or not the predetermined amount of time T2 has elapsed. In other words, the system controller 2 determines whether or not an amount of time T2 has elapsed with the photographic apparatus 1 in a stationary state. The predetermined amount of time T2 may be set to approximately one to three seconds, for example.

In addition, in step F307, the system controller 2 determines whether or not the photographic apparatus 1 has returned to the worn position (i.e., whether or not the magnetic force has been detected by the Hall element 10*b*).

If the photographic apparatus 1 has not returned to the worn position and instead has remained in a stationary state for at least the predetermined amount of time T2, then the system controller 2 judges that the user has a photographic intent, and in the subsequent step F308 configures settings for photographic operation in accordance with the manual shoot mode. More specifically, the system controller 2 turns on the monitor display, releases the operational lock on the shutter key 7*a*, and additionally issues instructions causing the photographic controller 4 to execute processing to configure settings for large image size and low compression ratio.

Subsequently, in step F309, the system controller 2 waits for a shutter operation (i.e., an operation of the shutter key 7*a*). Additionally, in step F310, the system controller 2 uses detected information from the sensor unit 10 to determine whether or not the photographic apparatus 1 has returned to the worn position (i.e., whether or not the magnetic force has been detected by the Hall element 10*b*). Subsequently, if the magnetic force is not detected, the process returns to step F309. For this reason, as long as the user continues to hold the photographic apparatus 1 and point the apparatus at a photographic subject, the system controller 2 waits for the user to operate the shutter key 7*a*.

If operation of the shutter key 7*a* is detected, then the photographic processing operations in step F312 are conducted. More specifically, the system controller 2 issues instructions causing the photographic controller 4 to acquire and process photographic image data as still image data (i.e., execute processing to yield a large image size and low compression ratio). The instructions also cause the photographic controller 4 to subsequently transfer the photographic image data to the storage unit 8, while also causing the storage unit 8 to save the photographic image data therein.

As a result, photographic operation for the manual shoot mode is conducted, whereby still image data for a single photograph is acquired and saved.

If the return of the photographic apparatus 1 to the worn position detected in step F310, then the system controller 2 returns to step F301 and transitions to processing for automatic shoot mode. The above is conducted if the return to the worn position is sensed after manual shooting is conducted at least once as a result of operating the shutter key 7*a*, or even if the shutter key 7*a* is not operated at all. Subsequently, the process proceeds to step F303 once the predetermined amount of time T1 has elapsed, settings are switched in accordance with the automatic shoot mode, and the processing for automatic shooting in step F311 is conducted.

In this way, if the user moves the photographic apparatus 1 to a non-worn position and then holds the photographic apparatus 1 in a stationary state while automatic shooting is being conducted, then it is judged that the user intends to manually take a photograph. Consequently, the photographic apparatus 1 is switched from an automatic shoot mode to a manual shoot mode, and photographic processing is executed in response to operation of the shutter key 7*a*.

In so doing, the user is able to manually take photographs by operating the shutter key 7*a* at arbitrary timings while also causing the photographic apparatus 1 to shoot photographs for a life log in an automatic shoot mode, and furthermore without the user paying particular attention to the operational mode of the photographic apparatus 1.

7. Exemplary Photographic Process IV

Similarly to the above exemplary photographic process I, an exemplary photographic process IV judges the photographic intent of the user by determining whether or not the user has held the photographic apparatus 1 for at least a predetermined amount of time.

However, in this case, the determination of whether the user is or is not holding the photographic apparatus 1 is made by detecting the load on the strap 10*a*.

When the photographic apparatus 1 is in a worn position as shown in FIG. 6A, a load is exerted on the strap 10*a* equal to the weight of the photographic apparatus 1. However, when the user is holding the photographic apparatus 1 as shown in FIG. 6B, the load of the photographic apparatus 1 is no longer exerted on the strap 10*a*. In other words, the state wherein a load is not exerted on the strap 10*a* for a certain amount of time is equivalent to the state wherein the user is holding the photographic apparatus 1, and thus the periods when the user has a photographic intent can be inferred.

In some cases, the photographic apparatus 1 may move vertically and the load on the strap 10*a* may be momentarily lost due to bodily swaying that accompanies the user's actions. However, the loss of the exerted load is usually not sustained in such cases, and thus is not misjudged as the user's photographic intent.

A mechanism for measuring load exerted on the strap 10*a* may be provided as the sensor unit 10.

Figure 10:
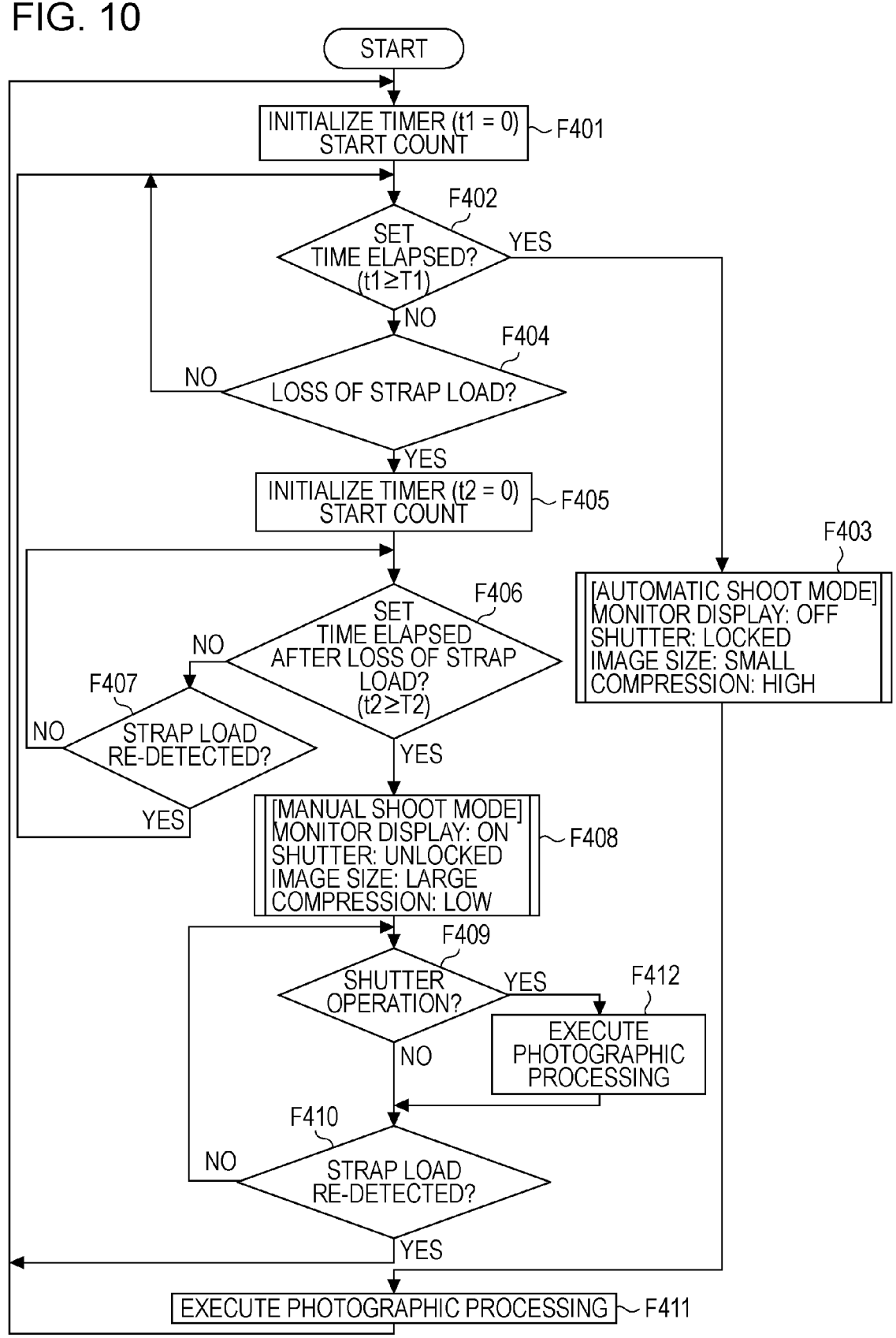
FIG. 10 is a flowchart for an exemplary photographic process IV in accordance with an embodiment of the present invention.

The flowchart in FIG. 10 illustrates an exemplary processing sequence conducted by the system controller 2 to realize the photographic process IV.

The processing indicated in steps F401, F402, F403, and F411 in FIG. 10 is identical to the processing for the automatic shoot mode that was described with reference to FIG. 5 (F101, F102, F103, and F111), and for this reason, a repeated description thereof is avoided herein.

A load sensor mechanism for detecting load exerted on the strap 10*a* is provided as the sensor unit 10.

While waiting for the predetermined amount of time T1 to elapse in step F202 as part of the automatic shoot mode, in step F404 the system controller 2 monitors the values detected by the load sensor.

Upon detecting the loss of load on the strap 10*a*, the system controller 2 proceeds to step F405, initializes a timer t2, and starts a count. The timer count is used to initiate measurement of the amount of time that the loss of load is sustained.

In step F406, the system controller 2 monitors the counter of the timer t2 to determine whether or not the predetermined amount of time T2 has elapsed. In other words, the system controller 2 determines whether or not an amount of time T2 has elapsed with a loss of the load exerted on the strap 10*a*. The predetermined amount of time T2 may be set from approximately two to several seconds, for example. The amount of time T2 is used to detect whether or not the user is holding the photographic apparatus 1.

In addition, in step F407, the system controller 2 determines whether or not a load has been exerted on the strap 10*a*. In other words, the system controller 2 determines whether or not the user has stopped holding the photographic apparatus 1.

If the state wherein no load is exerted on the strap 10*a* is sustained for at least the predetermined amount of time T2, then the system controller 2 judges that the user is holding the photographic apparatus 1 and has a photographic intent, and in the subsequent step F408 configures settings for photographic operation in accordance with the manual shoot mode. More specifically, the system controller 2 turns on the monitor display, releases the operational lock on the shutter key 7*a*, and additionally issues instructions causing the photographic controller 4 to execute processing to configure settings for large image size and low compression ratio.

Subsequently, in step F409, the system controller 2 waits for a shutter operation (i.e., an operation of the shutter key 7*a*). Additionally, in step F410, the system controller 2 monitors detected information from the sensor unit 10 (i.e., the load sensor mechanism) to determine whether or not the user has stopped holding the photographic apparatus 1. As long as the user continues to hold the photographic apparatus 1, the system controller 2 waits for operation of the shutter key 7*a* in step F409.

Subsequently, if operation of the shutter key 7*a* is detected, then the photographic processing operations in step F312 are conducted. More specifically, the system controller 2 issues instructions causing the photographic controller 4 to acquire and process photographic image data as still image data (i.e., execute processing to yield a large image size and low compression ratio). The instructions also cause the photographic controller 4 to subsequently transfer the photographic image data to the storage unit 8, while also causing the storage unit 8 to save the photographic image data therein.

As a result, photographic operation for the manual shoot mode is conducted, whereby still image data for a single photograph is acquired and saved.

If the exertion of a load on the strap 10*a* (i.e., the user releasing the photographic apparatus 1) is detected in step F410, then the system controller 2 returns to step F401 and transitions to processing for automatic shoot mode. The above is conducted if the load is sensed after manual shooting is conducted at least once as a result of operating the shutter key 7*a*, or even if the shutter key 7*a* is not operated at all. Subsequently, the process proceeds to step F403 once the predetermined amount of time T1 has elapsed, settings are switched in accordance with the automatic shoot mode, and the processing for automatic shooting in step F411 is conducted.

In this way, if the user holds the photographic apparatus 1 and the loss of a load exerted on the strap 10*a* for at least a predetermined amount of time is detected while automatic shooting is being conducted, then it is judged that the user intends to manually take a photograph. Consequently, the photographic apparatus 1 is switched from an automatic shoot mode to a manual shoot mode, and photographic processing is executed in response to operation of the shutter key 7*a*.

In so doing, the user is able to manually take photographs by operating the shutter key 7*a* at arbitrary timings while also causing the photographic apparatus 1 to shoot photographs for a life log in an automatic shoot mode, and furthermore without the user paying particular attention to the operational mode of the photographic apparatus 1.

Furthermore, the photographic apparatus 1 may also be configured such that, in addition using a load sensor to detect whether or not a load is exerted on the strap 10*a*, an acceleration or similar sensor is also used to detect whether the photographic apparatus 1 is completely stationary or slightly moving due to slight movements of the user's hands.

For example, a loss of load exerted on the strap 10*a* may be detected in the case where the photographic apparatus 1 is removed from the user's body and set aside. However, in this case, it can be judged that the user is not holding the photographic apparatus 1 if the apparatus is completely stationary.

In other words, a more accurate process for inferring the user's photographic intent is realized by means of an AND condition that stipulates both a loss of load on the strap 10*a* and movement of the photographic apparatus 1 (i.e., the movement corresponding to the user holding the photographic apparatus 1).

8. Exemplary Photographic Process V

An exemplary photographic process V will now be described.

Figure 11:
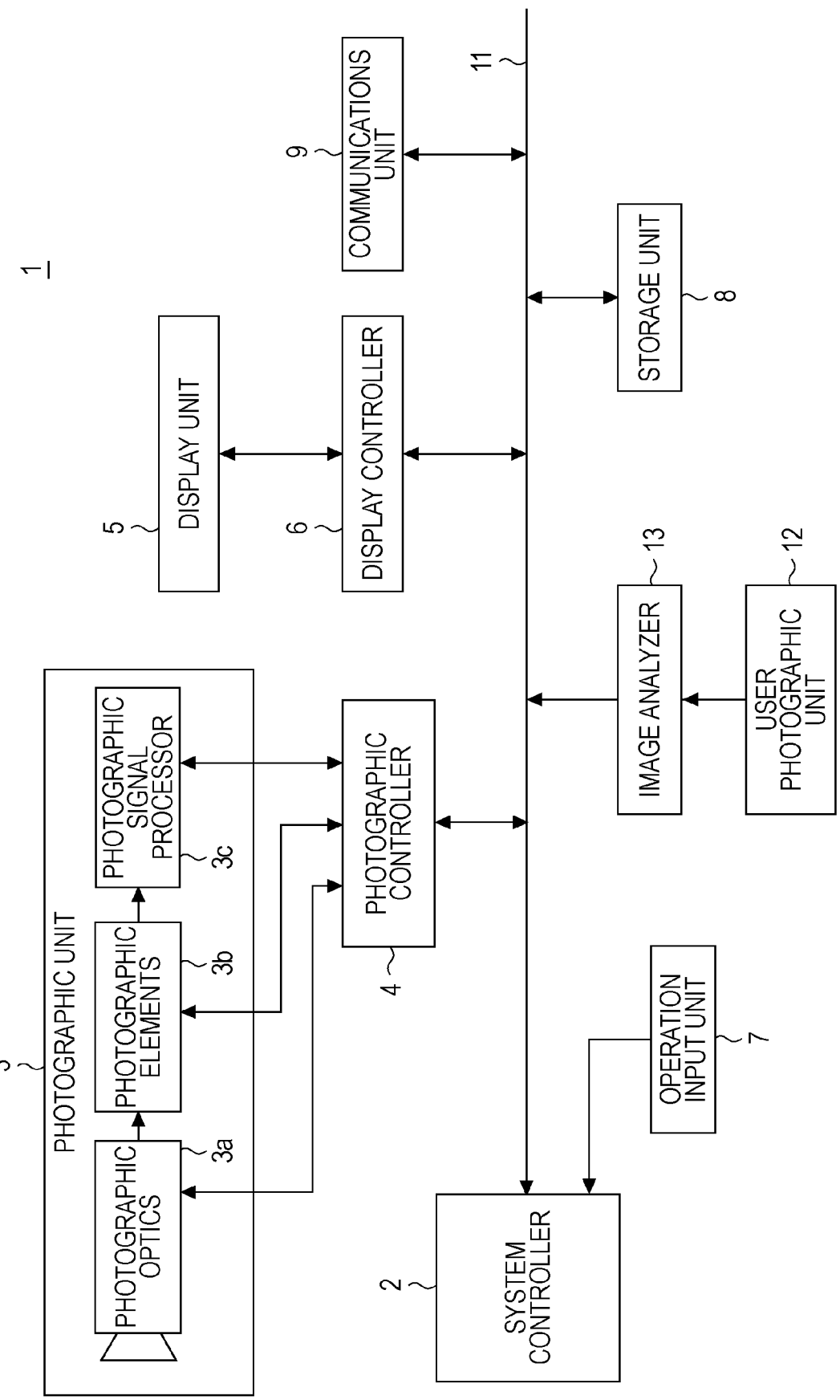
FIG. 11 is a block diagram for a photographic apparatus corresponding to an exemplary photographic process V in accordance with an embodiment of the present invention.

The photographic process V is an exemplary process for the case wherein the photographic apparatus 1 is provided with a user photographic unit 12 that acquires an image of the user, and an image analyzer 13 that analyzes the image acquired by the user photographic unit 12, as shown in FIG. 11.

FIG. 11 illustrates an exemplary configuration of a photographic apparatus 1 implementing the photographic process V. However, the user photographic unit 12 and the image analyzer 13 have been provided in place of the sensor unit 10 shown in FIG. 3. Other features of the configuration are identical to those of FIG. 3, and the portions identical to those in FIG. 3 are referred to using identical reference numbers. Further description of such identical portions is omitted herein for the sake of brevity.

Figure 12A:
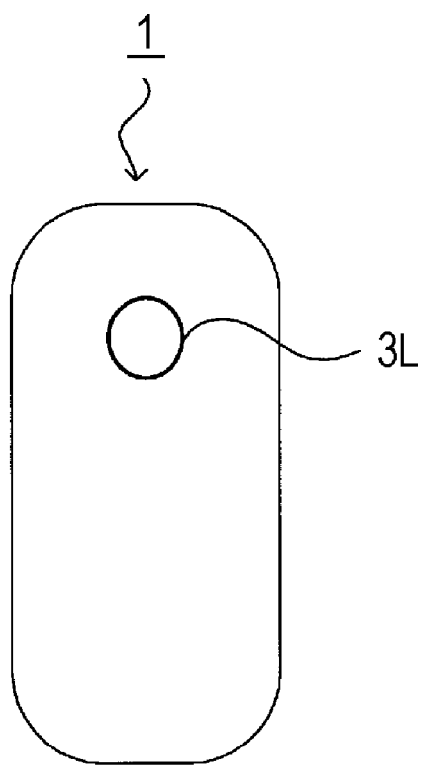
FIG. 12A is a diagram illustrating a front view of a photographic apparatus corresponding to the exemplary photographic process V in accordance with an embodiment of the present invention.
Figure 12B:
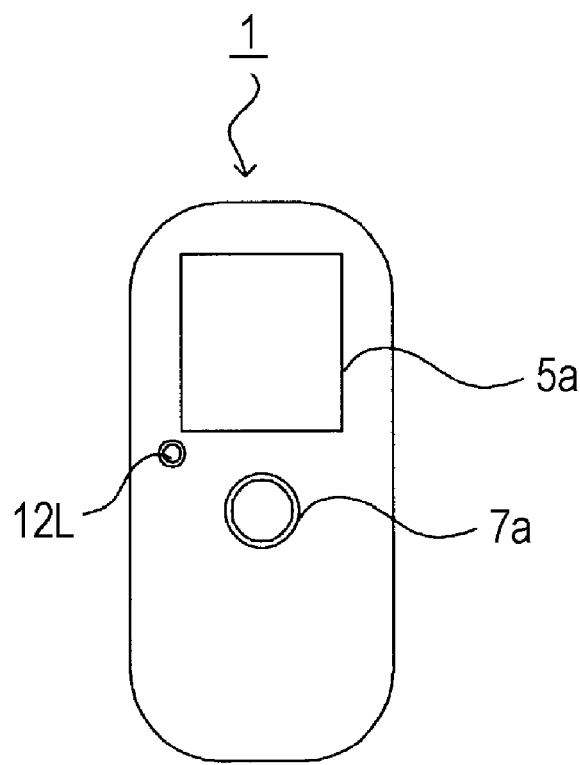
FIG. 12B is a diagram illustrating a rear view of a photographic apparatus corresponding to the exemplary photographic process V in accordance with an embodiment of the present invention.

The user photographic unit 12 has a photographic direction that faces the user when the user is manually taking a photograph. For example, FIGS. 12A and 12B illustrate front and rear views of the photographic apparatus 1. As shown by way of example in FIGS. 12A and 12B, a photographic lens 12L is disposed at a position B near the display panel 5*a*, the position B being on the back side as shown in FIG. 12B, and not the front side whereon the photographic lens 3L is provided.

Figure 13A:
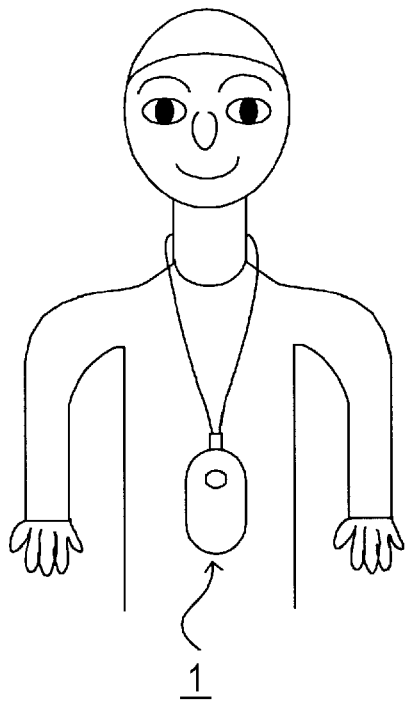
FIG. 13A is a diagram illustrating eye detection conducted by a photographic apparatus in accordance with an embodiment of the present invention.
Figure 13B:
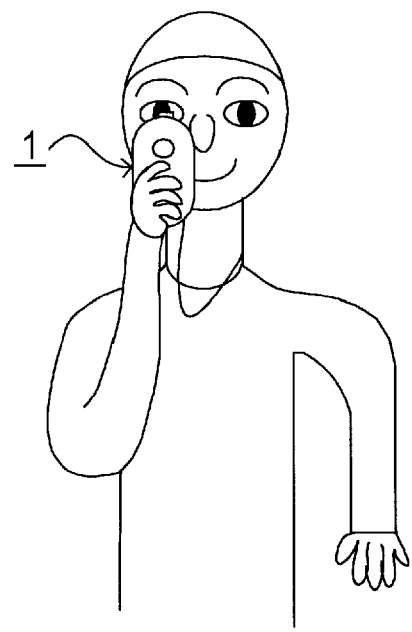
FIG. 13B is a diagram illustrating eye detection conducted by a photographic apparatus in accordance with an embodiment of the present invention.
Figure 13C:
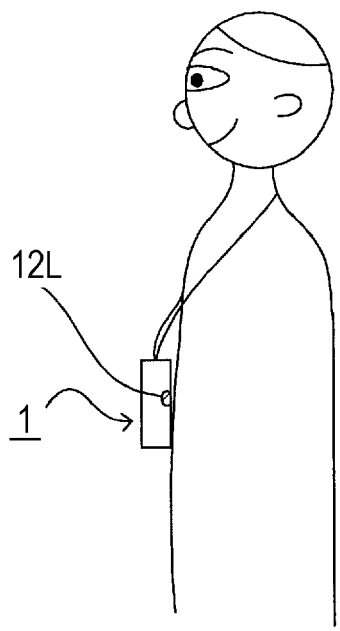
FIG. 13C is a diagram illustrating eye detection conducted by a photographic apparatus in accordance with an embodiment of the present invention.
Figure 13D:
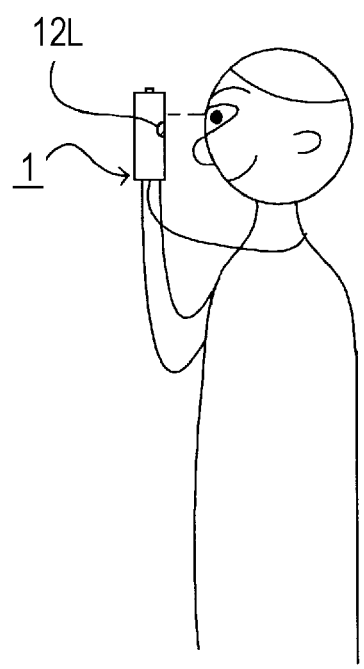
FIG. 13D is a diagram illustrating eye detection conducted by a photographic apparatus in accordance with an embodiment of the present invention.

In addition, FIGS. 13A and 13C illustrate the case wherein the photographic apparatus 1 is in the worn position, while FIGS. 13B and 13D illustrate the case wherein the photographic apparatus 1 is positioned for manual shooting. When shooting manually (i.e., when the user is deciding on a photographic subject by viewing the monitor display shown on the display panel 5*a*), the photographic lens 12L is configured to acquire an image of the user's face.

Similarly to the photographic unit 3, the user photographic unit 12 is configured having photographic optics (including the photographic lens 12L), photographic elements, and a photographic signal processor.

The photographic image data imaged by a user photographic unit 12 configured as above is then analyzed by the image analyzer 13.

The image analyzer 13 is configured as a microprocessor or as a DSP (digital signal processor) for image processing. The image analyzer 13 conducts analysis to determine whether or not a portion of a human face is present within the image represented by the photographic image data. For example, the image analyzer 13 may conduct analysis processing to determine whether or not a human eye is included in input photographic image data. The image analyzer 13 is able to determine whether or not an image of an eye exists within the image represented by the photographic image data by recognizing, in an image, component elements of the eye such as the lens or the iris, as well as the edges thereof, for example.

The image analyzer 13 then issues the analysis result to the system controller 2 as a notification containing information regarding whether or not an eye is included.

Herein, the image analyzer 13 is illustrated as being a functional block separate from the system controller 2. However, it should be appreciated that a microprocessor that realizes the system controller 2 may also be provided with the functions of the image analyzer 13.

If the user's eye is detected in the photographic image data acquired from the user photographic unit 12, then the system controller 2 infers that the user has a photographic intent, and executes processing for the manual shoot mode.

More specifically, when the photographic apparatus 1 is in the worn position as shown in FIGS. 13A and 13C, the user's chest area is imaged by the user photographic unit 12, and thus an eye is not detected by the image analyzer 13.

However, if the user holds the photographic apparatus 1 as shown in FIGS. 13B and 13C with an intent to manually take a photograph, and subsequently views the display panel 5*a* to confirm the photographic subject, then the user's face is imaged by the user photographic unit 12. In this case, an eye is detected within the photographic image by the image analyzer 13.

Consequently, the system controller 2 is configured such that, when photographic image data containing the user's eye is acquired by the user photographic unit 12, the system controller 2 judges that the user is performing actions for manually taking a photograph and thus has a photographic intent. The system controller 2 then executes processing to switch the photographic apparatus 1 from automatic shoot mode to manual shoot mode.

Figure 14:
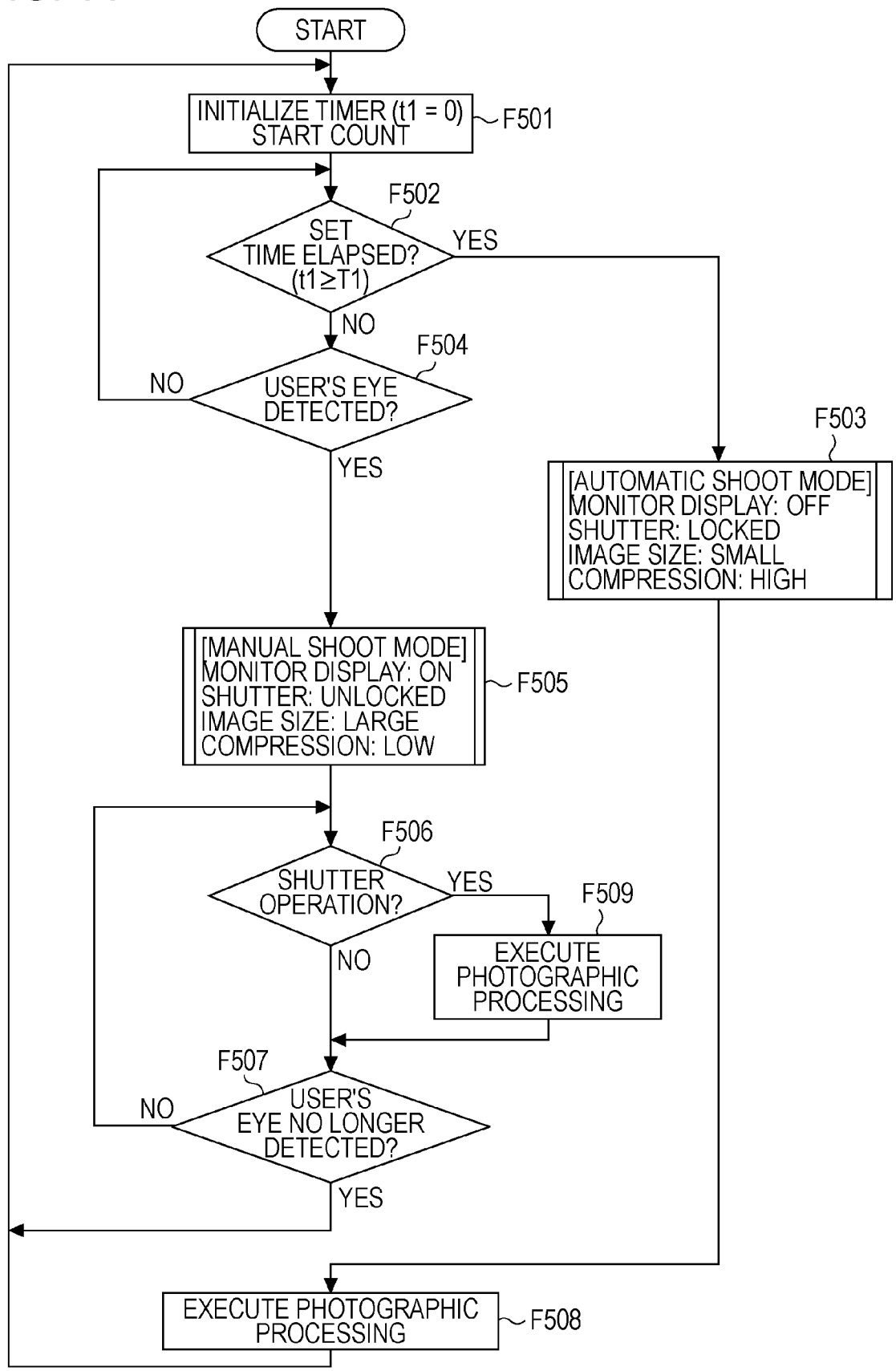
FIG. 14 is a flowchart for the exemplary photographic process V in accordance with an embodiment of the present invention.

The flowchart in FIG. 14 illustrates an exemplary processing sequence conducted by the system controller 2 to realize the photographic process V.

The processing indicated in steps F501, F502, F503, and F511 in FIG. 14 is identical to the processing for the automatic shoot mode that was described with reference to FIG. 5 (F101, F102, F103, and F111), and for this reason, a repeated description thereof is avoided herein.

While waiting for the predetermined amount of time T1 to elapse in step F502 as part of the automatic shoot mode, the system controller 2 checks for eye detection information from the image analyzer 13.

Subsequently, upon receiving an eye detection notification from the image analyzer 13, the system controller 2 proceeds to step F505. More specifically, the system controller 2 judges that the user has a photographic intent, and subsequently configures settings for photographic operation in accordance with the manual shoot mode. More specifically, the system controller 2 turns on the monitor display, releases the operational lock on the shutter key 7*a*, and additionally issues instructions causing the photographic controller 4 to execute processing to configure settings for large image size and low compression ratio.

Subsequently, in step F506, the system controller 2 waits for a shutter operation (i.e., an operation of the shutter key 7*a*). Additionally, in step F507, the system controller 2 continuously checks for a notification from the image analyzer 13 to determine whether or not the user's eye is still being detected. If the user's eye continues to be detected, the system controller 2 continues to wait for operation of the shutter key 7*a* in step F506. Consequently, the system controller 2 waits for the user to operate the shutter key 7*a* for as long as the user maintains a shooting posture.

If operation of the shutter key 7*a* is detected, then the photographic processing operations in step F509 are conducted. More specifically, the system controller 2 issues instructions causing the photographic controller 4 to acquire and process photographic image data as still image data (i.e., execute processing to yield a large image size and low compression ratio). The instructions also cause the photographic controller 4 to subsequently transfer the photographic image data to the storage unit 8, while also causing the storage unit 8 to save the photographic image data therein.

As a result, photographic operation for the manual shoot mode is conducted, whereby still image data for a single photograph is acquired and saved.

If the system controller 2 confirms that user's eye has ceased to be detected in step F507, then the system controller 2 returns to step F501 and transitions to processing for automatic shoot mode. The above is conducted if the eye detection ceases after manual shooting is conducted at least once as a result of operating the shutter key 7*a*, or even if the shutter key 7*a* is not operated at all. Subsequently, the process proceeds to step F503 once the predetermined amount of time T1 has elapsed, settings are switched in accordance with the automatic shoot mode, and the processing for automatic shooting in step F508 is conducted.

In this way, if the user holds the photographic apparatus 1 and assumes a shooting posture while automatic shooting is being conducted, then a determination is made using an image of the user's face acquired by the user photographic unit 12 (i.e., the user's eye is detected in the photographic image), and the system controller 2 judges that the user intends to manually take a photograph as a result of the detection of the user's eye. Consequently, the photographic apparatus 1 is switched from an automatic shoot mode to a manual shoot mode, and photographic processing is executed in response to operation of the shutter key 7*a*.

In so doing, the user is able to manually take photographs by operating the shutter key 7*a* at arbitrary timings while also causing the photographic apparatus 1 to shoot photographs for a life log in an automatic shoot mode, and furthermore without the user paying particular attention to the operational mode of the photographic apparatus 1.

Although the present example describes detection of the eye, it should be appreciated that the photographic apparatus 1 may also be configured to transition to manual shoot mode in the case where an image of an entire human face or other component thereof (such as the eyes, nose, or mouth) is detected by an image analyzer.

9. Advantages of the Embodiments and Modifications

According to the foregoing embodiments, advantages like the following are obtained.

First, since the switching between the automatic shoot mode and the manual shoot mode is executed according to the result of a judgment regarding the user's photographic intent, the user is able to naturally use automatic shooting and manual shooting for different purposes. For example, the user is able to easily take photographs manually at arbitrary times while also causing the photographic apparatus 1 to conduct automatic shooting for use in a life log. In other words, the user may use the photographic apparatus 1 without paying attention to whether the photographic apparatus 1 is in automatic shoot mode or manual shoot mode, and simply perform a shutter operation when a particular photograph is desired. As a result, the photographic apparatus 1 becomes very easy to use.

Furthermore, as a result of the above, the loss of a photographic opportunity due to the effort involved in switching to manual shooting is also prevented.

In addition, the photographic apparatus 1 modifies settings when changing to either the automatic shoot mode or the manual shoot mode. Such settings include toggling a monitor display and an operational lock on a user-operable shutter element, and additionally modifying settings such as the image size and compression ratio for the photographic image data to be saved. In so doing, operation suitable for respective modes is realized.

In automatic shoot mode, consumed power is reduced by turning off the monitor display, and thus possibly improving battery life. However, when manually shooting as described above, the photographic apparatus 1 is switched to manual shoot mode in accordance with the user's photographic intent, and the monitor display shown by the display panel 5*a* is also initiated without the user manually switching the mode or turning on the monitor display. As a result, the user is not inconvenienced.

In addition, by applying an operational lock to the shutter key 7*a* while in automatic shoot mode, undesired operation due to contact of some kind is prevented.

Herein, an operational lock may refer to the provision of a lock mechanism whereby the shutter key 7*a* is mechanically prevented from being pressed, or alternatively, a functional setting whereby the system controller 2 ignores physical operation of the shutter key 7*a*.

In addition, photographic image data is processed and saved using settings for large image size and low compression ratio when shooting manually, while photographic image data is processed and saved using settings for small image size and high compression ratio when shooting automatically. Doing so meets the user desire to take photographs when manually shooting with higher image quality than that of automatic shooting. Furthermore, the potential is also reduced for the storage unit 8 to run out of storage capacity due to a large amount of photographic image data being acquired during automatic shooting.

Moreover, the above is realized without the user consciously changing each setting for compression ratio and image size.

The foregoing has described embodiments of the present invention, but a variety of modifications are also conceivable as the present invention.

Five techniques for inferring the photographic intent of the user for the purpose of switching the photographic operational mode have been described by way of example as the exemplary photographic processes I to V. However, other techniques are conceivable. Furthermore, a plurality of techniques may also be combined from among the exemplary photographic processes I to V.

As an example of another technique, the sensor unit 10 may be configured to be able to detect biological information such as the user's pulse, blood pressure, or brain waves. The user's photographic intent may then be inferred on the basis of the biological information, or alternatively, biological information may be inserted into a condition when inferring using the techniques of the above exemplary photographic processes I to V.

In addition, in the foregoing exemplary processes, the trigger whereby the photographic apparatus 1 returns to automatic shoot mode from manual shoot mode was described as the state of no longer detecting information from which the user's photographic intent can be inferred, such information being supplied from the sensor unit 10 or the image analyzer 13. However, other processes are also conceivable wherein, after having transitioned to manual shoot mode, the photographic apparatus 1 automatically returns to automatic shoot mode once a predetermined amount of time has elapsed, for example.

In the foregoing embodiments, automatic shooting and manual shooting were described using still image photography by way of example. However, operations for automatic shooting and manual shooting may also be presumed for the case of recording video.

In this case, configurations are conceivable wherein both the automatic shoot mode and the manual shoot mode are used for video recording, wherein the automatic shoot mode is used for video recording and the manual shoot mode is used for still image photography, and furthermore wherein the automatic shoot mode is used for still image photography and the manual shoot mode is used for video recording.

In any of the above cases, the foregoing operational examples may be applied to conduct controls for switching the mode and configuring operational settings.

It should be understood by those skilled in the art that various modifications, combinations, sub-combinations and alterations may occur depending on design requirements and other factors insofar as they are within the scope of the appended claims or the equivalents thereof.

What is claimed is:

1. A photographic apparatus, comprising:
   photographic means for photographing a scene, acquiring photographic image data of a subject, and executing processing for saving the photographic image data;
   intention judgment information detecting means for detecting intention judgment information used to judge a photographic intent of a user; and
   control means able to cause the photographic means to execute operations for both a manual shoot mode, wherein processing to save the photographic image data is timed in accordance with operations of a user-operable shutter element by the user, and an automatic shoot mode, wherein processing to save the photographic image data is conducted independently of shutter element operations, wherein the control means further makes a first intention judgment using the intention judgment information from the intention judgment information detecting means, and according to a first intention judgment result, causes the photographic means to selectively execute the operations for either the manual shoot mode or the automatic shoot mode.

2. The photographic apparatus according to claim 1, wherein the control means, in addition to causing the photographic means to execute the operations for the automatic shoot mode, makes the first intention judgment using the intention judgment information from the intention judgment information detecting means, and depending on the intention judgment result, subsequently causes the photographic means to execute the operations for the manual shoot mode.

3. The photographic apparatus according to claim 1, further comprising:
   display means for producing a monitor display of a subject image while photographic operations are being conducted by the photographic means;
   wherein the control means conducts a control that causes the display means to produce the monitor display when in the manual shoot mode, and turn off the monitor display when in the automatic shoot mode.

4. The photographic apparatus according to claim 1, wherein the control means applies an operational lock to user-operable shutter elements when the photographic apparatus is in the automatic shoot mode.

5. The photographic apparatus according to claim 1, wherein the control means causes the photographic means to execute processing to save photographic image data using respectively different image sizes for the automatic shoot mode and the manual shoot mode.

6. The photographic apparatus according claim 1, wherein the control means causes the photographic means to execute processing to save the photographic image data such that compression processing is specified using respectively different compression ratios for the automatic shoot mode and the manual shoot mode.

7. The photographic apparatus according to claim 1, wherein the control means makes the first intention judgment using the intention judgment information from the intention judgment information detecting means, the first intention judgment determining whether a body of the photographic apparatus has been held by the user for at least a predetermined amount of time.

8. The photographic apparatus according to claim 1, wherein the control means makes the first intention judgment using the intention judgment information from the intention judgment information detecting means, the first intention judgment determining whether a body of the photographic apparatus has moved in a set direction, and after such movement is detected, whether the body of the photographic apparatus has been in a stationary state for at least a predetermined amount of time.

9. The photographic apparatus according to claim 1, wherein the control means makes the first intention judgment using the intention judgment information from the intention judgment information detecting means, the first intention judgment determining whether a body of the photographic apparatus has moved from a worn position, and after such movement is detected, whether the body of the photographic apparatus has been in a stationary state for at least a predetermined amount of time.

10. The photographic apparatus according to claim 1, wherein
    the intention judgment information detecting means comprises:
       a user photographic unit for acquiring an image of the user, and
       an image analyzer for analyzing an image acquired by the user photographic unit, and wherein
    the control means makes the first intention judgment on the basis of the analysis result of the image analyzer.

11. A photographic method for a photographic apparatus that photographs a scene, acquires photographic image data of a subject, and then executes processing to save the photographic image data, the method comprising:
    operating in an automatic shoot mode, wherein processing to save photographic image data is automatically conducted independently of operations of a user-operable shutter element by a user;
    while operating in the automatic shoot mode, making an intention judgment for judging a photographic intent of the user; and
    depending on a result of the intention judgment with respect to the photographic intent of the user, operating in a manual shoot mode, wherein processing to save photographic image data is timed in accordance with operations of a user-operable shutter element by the user.

12. A photographic apparatus, comprising:
    a photographic unit configured to photograph a scene, to acquire photographic image data of a subject, and to execute processing for saving the photographic image data;
    an intention judgment information detector configured to detect intention judgment information used to judge a photographic intent of a user; and a controller configured to cause the photographic unit to execute operations for both a manual shoot mode, wherein processing to save the photographic image data is timed in accordance with operations of a user-operable shutter element by the user, and an automatic shoot mode, wherein processing to save the photographic image data is conducted independently of shutter element operations, wherein the controller further makes a first intention judgment using the intention judgment information from the intention judgment information detector, and according to the first intention judgment result, causes the photographic unit to selectively execute the operations for either the manual shoot mode or the automatic shoot mode.

* * * * *